(12) United States Patent
Orlick

(10) Patent No.: US 7,487,529 B1
(45) Date of Patent: Feb. 3, 2009

(54) ELECTRONIC PROGRAM GUIDE SYSTEM WITH ADVERTISING MESSAGES IN POP-UPS

(75) Inventor: Jonathan B. Orlick, Livermore, CA (US)

(73) Assignee: Starsight Telecast, Inc., Hollywood, CA (US)

( * ) Notice: Subject to any disclaimer, the term of this patent is extended or adjusted under 35 U.S.C. 154(b) by 0 days.

(21) Appl. No.: 09/555,551

(22) PCT Filed: Dec. 1, 1998

(86) PCT No.: PCT/US98/25490

§ 371 (c)(1),
(2), (4) Date: Aug. 29, 2000

(87) PCT Pub. No.: WO99/29109

PCT Pub. Date: Jun. 10, 1999

(51) Int. Cl.
*G06F 13/00* (2006.01)
*G06F 3/00* (2006.01)
*H04N 5/445* (2006.01)

(52) U.S. Cl. ............................... 725/42; 725/60; 725/61
(58) Field of Classification Search ............. 725/39–43, 725/32–36, 52, 60–61
See application file for complete search history.

(56) References Cited

U.S. PATENT DOCUMENTS

| | | | |
|---|---|---|---|
| 3,440,427 A | 4/1969 | Kammer | |
| 3,492,577 A | 1/1970 | Reiter et al. | |
| 3,493,674 A | 2/1970 | Haoghton | |
| 3,729,581 A | 4/1973 | Anderson | |
| 3,833,757 A | 9/1974 | Kirk, Jr. et al. | |
| 3,891,792 A | 6/1975 | Kimura | |
| 3,936,868 A | 2/1976 | Thorpe | |
| 3,996,583 A | 12/1976 | Hutt et al. | |
| 4,004,085 A | 1/1977 | Makino et al. | |
| 4,016,361 A | 4/1977 | Pandey | |
| 4,026,555 A | 5/1977 | Kirschner et al. | |
| 4,031,548 A | 6/1977 | Kato et al. | |
| 4,052,719 A | 10/1977 | Hutt et al. | |
| 4,058,830 A | 11/1977 | Guinet et al. | |
| 4,079,419 A | 3/1978 | Siegle et al. | |
| 4,081,753 A | 3/1978 | Miller | |

(Continued)

FOREIGN PATENT DOCUMENTS

AU    56198/98    7/1998

(Continued)

OTHER PUBLICATIONS

International Preliminary Examination Report, PCT/US98/25490, Mailed Mar. 27, 2000.

(Continued)

*Primary Examiner*—Hunter B. Lonsberry
(74) *Attorney, Agent, or Firm*—Ropes & Gray LLP

(57) ABSTRACT

In one embodiment, informational messages about the program or channel to which a television receiver is tuned and advertising messages are displayed simultaneously with the current television program.

In another embodiment, an EPG is displayed in a composite with an advertising message. Before such display, the microprocessor substitutes a transparency value for the stored background color value used to display the EPG alone in the conventional fashion on a background of a solid color or colors.

31 Claims, 10 Drawing Sheets

U.S. PATENT DOCUMENTS

| | | |
|---|---|---|
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,276,597 A | 6/1981 | Dissly et al. |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,331,974 A | 5/1982 | Cogswell et al. ............... 358/86 |
| 4,337,480 A | 6/1982 | Bourassin et al. |
| 4,337,483 A | 6/1982 | Guillou |
| 4,344,090 A | 8/1982 | Belisomi et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,531,020 A | 7/1985 | Wechselberger et al. |
| 4,533,910 A | 8/1985 | Sukonick et al. |
| 4,536,791 A | 8/1985 | Campbell et al. ............ 358/122 |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffman |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. ................. 380/20 |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,718,107 A | 1/1988 | Hayes |
| RE32,632 E | 3/1988 | Atkinson |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga et al. |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,940 A | 2/1991 | Dworkin |
| 4,995,078 A | 2/1991 | Monslow et al. |
| 4,996,642 A | 2/1991 | Hey ........................... 364/419 |
| 4,998,171 A | 3/1991 | Kim et al. |
| 5,008,853 A | 4/1991 | Bly et al. |
| 5,014,125 A | 5/1991 | Pocock et al. |
| 5,027,400 A | 6/1991 | Baji et al. |
| 5,036,314 A | 7/1991 | Barillari et al. |
| 5,038,211 A | 8/1991 | Hallenbeck |
| 5,045,947 A | 9/1991 | Beery |

| Patent | Date | Inventor | | Patent | Date | Inventor |
|---|---|---|---|---|---|---|
| 5,047,867 A | 9/1991 | Strubbe et al. | | 5,357,276 A | 10/1994 | Banker et al. ............... 725/102 |
| 5,058,160 A | 10/1991 | Banker et al. | | 5,359,367 A | 10/1994 | Stockill |
| 5,062,060 A | 10/1991 | Kolnick | | 5,359,601 A | 10/1994 | Wasilewski et al. |
| 5,068,734 A | 11/1991 | Beery | | 5,365,282 A | 11/1994 | Levine |
| 5,072,412 A | 12/1991 | Henderson, Jr. et al. | | 5,367,316 A | 11/1994 | Ikezaki |
| 5,083,800 A | 1/1992 | Lockton | | 5,367,330 A | 11/1994 | Haave et al. |
| 5,091,785 A | 2/1992 | Canfield et al. | | 5,373,288 A | 12/1994 | Blahut |
| 5,093,921 A | 3/1992 | Bevins, Jr. | | 5,374,951 A | 12/1994 | Welsh ............................ 348/4 |
| 5,099,319 A | 3/1992 | Esch et al. .................... 358/86 | | 5,377,317 A | 12/1994 | Bates et al. |
| 5,103,314 A | 4/1992 | Keenan | | 5,377,319 A | 12/1994 | Kitahara et al. |
| 5,105,184 A | 4/1992 | Pirani et al. | | 5,382,983 A | 1/1995 | Kwoh et al. |
| 5,119,188 A | 6/1992 | McCalley et al. | | 5,384,910 A | 1/1995 | Torres |
| 5,121,476 A | 6/1992 | Yee | | 5,387,945 A | 2/1995 | Takeuchi |
| 5,123,046 A | 6/1992 | Levine | | 5,398,074 A | 3/1995 | Duffield et al. |
| 5,126,851 A | 6/1992 | Yoshimura | | 5,404,393 A | 4/1995 | Remillard |
| 5,148,154 A | 9/1992 | MacKay et al. | | 5,410,326 A | 4/1995 | Goldstein |
| 5,151,782 A | 9/1992 | Ferraro | | 5,410,343 A | 4/1995 | Coddington et al. |
| 5,151,789 A | 9/1992 | Young .................... 358/194.1 | | 5,410,344 A | 4/1995 | Graves et al. ................. 348/1 |
| 5,155,591 A | 10/1992 | Wachob ....................... 358/86 | | 5,410,367 A | 4/1995 | Zahavi et al. |
| 5,155,806 A | 10/1992 | Hoeber et al. | | 5,412,720 A | 5/1995 | Hoarty |
| 5,157,768 A | 10/1992 | Hoeber et al. | | 5,416,508 A | 5/1995 | Sakuma et al. |
| 5,161,023 A | 11/1992 | Keenan | | 5,424,770 A | 6/1995 | Schmelzer et al. |
| 5,162,905 A | 11/1992 | Itoh et al. | | 5,425,101 A | 6/1995 | Woo et al. |
| 5,170,388 A | 12/1992 | Endoh et al. | | 5,432,561 A | 7/1995 | Strubbe |
| 5,172,111 A | 12/1992 | Olivo, Jr. | | 5,434,626 A | 7/1995 | Hayashi et al. |
| 5,177,604 A | 1/1993 | Martinez | | 5,436,676 A | 7/1995 | Pint et al. |
| 5,179,654 A | 1/1993 | Richards et al. | | 5,438,372 A | 8/1995 | Tsumori et al. |
| 5,195,092 A | 3/1993 | Wilson et al. | | 5,446,919 A | 8/1995 | Wilkins ...................... 455/6.2 |
| 5,200,823 A | 4/1993 | Yoneda et al. | | 5,452,012 A | 9/1995 | Saitoh ........................ 348/563 |
| 5,204,897 A | 4/1993 | Wyman | | 5,459,522 A | 10/1995 | Pint |
| 5,206,722 A | 4/1993 | Kwan | | 5,461,415 A | 10/1995 | Wolf et al. |
| 5,210,611 A | 5/1993 | Yee et al. | | 5,465,113 A | 11/1995 | Gilboy |
| 5,212,553 A | 5/1993 | Maruoka .................... 358/188 | | 5,465,385 A | 11/1995 | Ohga et al. |
| 5,214,622 A | 5/1993 | Nemoto et al. | | 5,469,206 A | 11/1995 | Strubbe et al. |
| 5,216,515 A | 6/1993 | Steele et al. | | 5,477,262 A | 12/1995 | Banker et al. |
| 5,220,420 A | 6/1993 | Hoarty et al. | | 5,479,266 A | 12/1995 | Young et al. |
| 5,223,924 A | 6/1993 | Strubbe ....................... 358/86 | | 5,479,268 A | 12/1995 | Young et al. |
| 5,227,874 A | 7/1993 | Von Kohorn ................. 358/84 | | 5,479,497 A | 12/1995 | Kovarik |
| 5,231,493 A | 7/1993 | Apitz | | 5,481,296 A | 1/1996 | Cragun et al. |
| RE34,340 E | 8/1993 | Freeman | | 5,483,278 A | 1/1996 | Strubbe et al. .............. 348/563 |
| 5,233,423 A | 8/1993 | Jernigan et al. | | 5,485,197 A | 1/1996 | Hoarty ........................... 348/7 |
| 5,233,654 A | 8/1993 | Harvey et al. | | 5,485,219 A | 1/1996 | Woo |
| 5,235,415 A | 8/1993 | Bonicel et al. | | 5,485,221 A | 1/1996 | Banker et al. |
| 5,236,199 A | 8/1993 | Thompson, Jr. | | 5,488,409 A | 1/1996 | Yuen et al. ..................... 348/5 |
| 5,237,411 A | 8/1993 | Fink et al. | | 5,495,295 A | 2/1996 | Long |
| 5,237,417 A | 8/1993 | Hayashi et al. | | 5,502,504 A | 3/1996 | Marshall et al. ............. 348/565 |
| 5,237,418 A | 8/1993 | Kaneko | | 5,515,098 A | 5/1996 | Carles ............................ 348/8 |
| 5,239,540 A | 8/1993 | Rovira et al. | | 5,523,794 A | 6/1996 | Mankovitz et al. |
| 5,245,420 A | 9/1993 | Harney et al. | | 5,523,796 A | 6/1996 | Marshall et al. |
| 5,247,347 A | 9/1993 | Litteral et al. | | 5,524,195 A | 6/1996 | Clanton, III et al. |
| 5,247,364 A | 9/1993 | Banker et al. | | 5,526,034 A | 6/1996 | Hoarty et al. |
| 5,247,580 A | 9/1993 | Kimura et al. | | 5,528,304 A | 6/1996 | Cherrick et al. |
| 5,253,066 A | 10/1993 | Vogel .......................... 358/188 | | 5,532,735 A | 7/1996 | Blahut et al. |
| 5,253,067 A | 10/1993 | Chaney et al. | | 5,532,754 A | 7/1996 | Young et al. |
| 5,260,778 A | 11/1993 | Kauffman et al. | | 5,534,911 A | 7/1996 | Levitan ........................ 348/1 |
| 5,260,999 A | 11/1993 | Wyman | | 5,537,141 A | 7/1996 | Harper et al. |
| 5,283,639 A | 2/1994 | Esch et al. | | 5,539,822 A | 7/1996 | Lett |
| 5,283,819 A | 2/1994 | Glick et al. | | 5,541,662 A | 7/1996 | Adams et al. |
| 5,301,028 A | 4/1994 | Banker et al. | | 5,541,738 A | 7/1996 | Mankovitz |
| 5,307,173 A | 4/1994 | Yuen et al. | | 5,550,576 A | 8/1996 | Klosterman |
| 5,311,423 A | 5/1994 | Clark | | 5,557,338 A | 9/1996 | Maze et al. |
| 5,313,282 A | 5/1994 | Hayashi | | 5,557,721 A | 9/1996 | Fite et al. ..................... 395/148 |
| 5,319,445 A | 6/1994 | Fitts | | 5,559,548 A | 9/1996 | Davis et al. ................... 725/40 |
| 5,323,234 A | 6/1994 | Kawasaki | | 5,559,549 A | 9/1996 | Hendricks et al. .............. 348/6 |
| 5,323,240 A | 6/1994 | Amano et al. | | 5,559,550 A | 9/1996 | Mankovitz ..................... 348/6 |
| 5,325,183 A | 6/1994 | Rhee | | 5,559,942 A | 9/1996 | Gough et al. |
| 5,325,423 A | 6/1994 | Lewis | | 5,561,471 A | 10/1996 | Kim et al. |
| 5,335,277 A | 8/1994 | Harvey et al. ................. 380/20 | | 5,570,295 A | 10/1996 | Isenberg et al. |
| 5,343,239 A | 8/1994 | Lappington et al. | | 5,572,442 A | 11/1996 | Schulhof et al. ............. 364/514 |
| 5,347,167 A | 9/1994 | Singh | | 5,574,962 A | 11/1996 | Fardeau et al. ................. 455/2 |
| 5,347,632 A | 9/1994 | Filepp et al. | | 5,579,055 A | 11/1996 | Hamilton et al. |
| 5,351,075 A | 9/1994 | Herz et al. ...................... 348/1 | | 5,581,479 A | 12/1996 | McLaughlin et al. |
| 5,353,121 A | 10/1994 | Young et al. ................. 348/563 | | 5,582,364 A | 12/1996 | Trulin et al. |

| | | |
|---|---|---|
| 5,583,560 A | 12/1996 | Florin et al. |
| 5,583,563 A | 12/1996 | Wanderscheid et al. |
| 5,585,838 A | 12/1996 | Lawler et al. .................. 348/13 |
| 5,585,865 A | 12/1996 | Amano et al. |
| 5,585,866 A | 12/1996 | Miller et al. ................. 348/731 |
| 5,589,892 A | 12/1996 | Knee et al. ................... 348/731 |
| 5,592,551 A | 1/1997 | Lett et al. .................... 380/211 |
| 5,594,509 A * | 1/1997 | Florin et al. .................... 725/43 |
| 5,596,373 A | 1/1997 | White et al. |
| 5,600,364 A | 2/1997 | Hendricks et al. .............. 348/1 |
| 5,600,366 A | 2/1997 | Schulman |
| 5,600,573 A | 2/1997 | Hendricks et al. ....... 364/514 R |
| 5,602,582 A | 2/1997 | Wanderscheid et al. |
| 5,602,596 A | 2/1997 | Claussen et al. |
| 5,602,597 A | 2/1997 | Bertram |
| 5,602,598 A | 2/1997 | Shintani |
| 5,606,374 A | 2/1997 | Bertram |
| 5,610,653 A | 3/1997 | Abecassis ................... 348/110 |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. .................... 725/43 |
| 5,623,613 A | 4/1997 | Rowe et al. ................. 395/353 |
| 5,627,940 A | 5/1997 | Rohra et al. |
| 5,629,733 A | 5/1997 | Youman et al. ................ 348/7 |
| 5,630,119 A | 5/1997 | Aristides et al. |
| 5,631,995 A | 5/1997 | Weissensteiner et al. |
| 5,633,683 A | 5/1997 | Rosengren et al. |
| 5,635,978 A | 6/1997 | Alten et al. .................... 348/7 |
| 5,635,979 A | 6/1997 | Kostreski et al. .............. 348/13 |
| 5,635,989 A | 6/1997 | Rothmuller |
| 5,636,346 A | 6/1997 | Saxe .......................... 395/401 |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. .............. 348/13 |
| 5,657,091 A | 8/1997 | Bertram ...................... 348/559 |
| 5,659,350 A | 8/1997 | Hendricks et al. .............. 348/6 |
| 5,659,366 A | 8/1997 | Kerman |
| 5,661,516 A | 8/1997 | Carles |
| 5,661,517 A | 8/1997 | Budow et al. |
| 5,663,757 A | 9/1997 | Morales ...................... 348/13 |
| 5,664,111 A | 9/1997 | Nahan et al. |
| 5,666,293 A | 9/1997 | Metz ........................ 395/200.5 |
| 5,666,498 A | 9/1997 | Amro |
| 5,666,645 A | 9/1997 | Thomas et al. ................ 455/6.1 |
| 5,671,276 A | 9/1997 | Eyer et al. |
| 5,671,411 A | 9/1997 | Watts et al. |
| 5,675,390 A | 10/1997 | Schindler et al. |
| 5,675,752 A | 10/1997 | Scott et al. |
| 5,677,708 A | 10/1997 | Matthews, III et al. ...... 345/115 |
| 5,682,195 A | 10/1997 | Hendricks et al. .............. 348/6 |
| 5,682,206 A | 10/1997 | Wehmeyer et al. |
| 5,687,331 A | 11/1997 | Volk et al. ................... 395/327 |
| 5,689,648 A | 11/1997 | Diaz et al. |
| 5,689,666 A | 11/1997 | Berquist et al. |
| 5,692,214 A | 11/1997 | Levine |
| 5,694,163 A | 12/1997 | Harrison |
| 5,694,176 A | 12/1997 | Bruette et al. |
| 5,694,381 A | 12/1997 | Sako |
| 5,696,905 A | 12/1997 | Reimer et al. |
| 5,699,107 A | 12/1997 | Lawler et al. |
| 5,699,125 A | 12/1997 | Rzeszewski et al. |
| 5,708,478 A | 1/1998 | Tognazzini |
| 5,710,601 A | 1/1998 | Marshall et al. |
| 5,710,815 A | 1/1998 | Ming et al. |
| 5,715,314 A | 2/1998 | Payne et al. |
| 5,715,399 A | 2/1998 | Bezos |
| 5,717,452 A | 2/1998 | Janin et al. |
| 5,721,829 A | 2/1998 | Dunn et al. |
| 5,724,521 A | 3/1998 | Dedrick ...................... 395/226 |
| 5,724,525 A | 3/1998 | Beyers et al. |
| 5,727,060 A | 3/1998 | Young |
| 5,727,163 A | 3/1998 | Bezos |
| 5,731,844 A | 3/1998 | Rauch et al. |
| 5,734,444 A | 3/1998 | Yoshinobu |
| 5,734,853 A | 3/1998 | Hendricks et al. ........... 395/352 |
| 5,734,893 A | 3/1998 | Li |
| 5,737,028 A | 4/1998 | Bertram et al. |
| 5,737,030 A | 4/1998 | Hong et al. |
| 5,740,549 A | 4/1998 | Reilly et al. .................... 705/14 |
| 5,751,282 A | 5/1998 | Girard et al. |
| 5,752,159 A | 5/1998 | Faust et al. |
| 5,754,258 A | 5/1998 | Hanaya et al. |
| 5,754,771 A | 5/1998 | Epperson et al. |
| 5,754,939 A | 5/1998 | Herz et al. .................... 455/4.2 |
| 5,757,417 A | 5/1998 | Aras et al. |
| 5,758,257 A | 5/1998 | Herz et al. ...................... 455/2 |
| 5,758,259 A | 5/1998 | Lawler |
| 5,760,821 A | 6/1998 | Ellis et al. ...................... 348/10 |
| 5,761,372 A | 6/1998 | Yoshinobu et al. |
| 5,761,601 A | 6/1998 | Nemirofsky et al. |
| 5,768,528 A | 6/1998 | Stumm |
| 5,774,170 A | 6/1998 | Hite et al. ...................... 348/9 |
| 5,774,534 A | 6/1998 | Mayer |
| 5,774,887 A | 6/1998 | Wolff et al. |
| 5,778,182 A | 7/1998 | Cathey et al. |
| 5,781,226 A | 7/1998 | Sheehan |
| 5,781,245 A | 7/1998 | Weij et al. |
| 5,781,246 A | 7/1998 | Alten et al. .................. 348/569 |
| 5,790,202 A | 8/1998 | Kummer et al. |
| 5,790,426 A | 8/1998 | Robinson .................... 364/554 |
| 5,793,438 A | 8/1998 | Bedard |
| 5,793,964 A | 8/1998 | Rogers et al. |
| 5,798,785 A | 8/1998 | Hendricks et al. ............... 348/1 |
| 5,801,747 A | 9/1998 | Bedard ........................... 348/1 |
| 5,801,785 A | 9/1998 | Crump et al. ................ 348/563 |
| 5,801,787 A | 9/1998 | Schein et al. |
| 5,802,284 A | 9/1998 | Karlton et al. |
| 5,805,154 A | 9/1998 | Brown ........................ 345/327 |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,808,608 A | 9/1998 | Young et al. |
| 5,808,694 A | 9/1998 | Usui et al. ................... 348/569 |
| 5,809,204 A | 9/1998 | Young et al. |
| 5,812,205 A | 9/1998 | Milnes et al. |
| 5,815,145 A | 9/1998 | Matthews, III |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,541 A | 10/1998 | Matsuura et al. |
| 5,819,019 A | 10/1998 | Nelson |
| 5,819,156 A | 10/1998 | Belmont ......................... 455/2 |
| 5,819,284 A | 10/1998 | Farber et al. |
| 5,822,123 A | 10/1998 | Davis et al. .................. 348/564 |
| 5,828,402 A | 10/1998 | Collings |
| 5,828,419 A | 10/1998 | Bruette et al. |
| 5,828,420 A * | 10/1998 | Marshall et al. ............... 725/47 |
| 5,828,839 A | 10/1998 | Moncreiff ............. 395/200.34 |
| 5,828,945 A | 10/1998 | Klosterman |
| 5,830,068 A | 11/1998 | Brenner et al. ................ 463/42 |
| 5,838,314 A | 11/1998 | Neel et al. .................... 345/327 |
| 5,842,010 A | 11/1998 | Jain et al. .................... 395/675 |
| 5,842,199 A | 11/1998 | Miller et al. .................... 707/2 |

| Patent Number | Kind | Date | Inventor(s) | Class |
|---|---|---|---|---|
| 5,844,620 | A | 12/1998 | Coleman et al. | 348/461 |
| 5,848,352 | A | 12/1998 | Dougherty et al. | |
| 5,848,396 | A | 12/1998 | Gerace | 705/10 |
| 5,848,397 | A | 12/1998 | Marsh et al. | |
| 5,850,218 | A * | 12/1998 | LaJoie et al. | 725/45 |
| 5,862,292 | A | 1/1999 | Kubota et al. | |
| 5,867,226 | A | 2/1999 | Wehmeyer et al. | |
| 5,867,227 | A | 2/1999 | Yamaguchi | |
| 5,872,588 | A | 2/1999 | Aras et al. | 348/1 |
| 5,874,985 | A | 2/1999 | Matthews, III | |
| 5,880,768 | A | 3/1999 | Lemmons et al. | |
| 5,883,677 | A | 3/1999 | Hofmann | |
| 5,886,691 | A | 3/1999 | Furuya et al. | 345/327 |
| 5,886,731 | A | 3/1999 | Ebisawa | 348/9 |
| 5,892,498 | A | 4/1999 | Marshall et al. | |
| 5,892,535 | A | 4/1999 | Allen et al. | |
| 5,900,905 | A | 5/1999 | Shoff et al. | 348/12 |
| 5,903,314 | A | 5/1999 | Niijima et al. | |
| 5,903,816 | A | 5/1999 | Broadwin et al. | |
| 5,905,497 | A | 5/1999 | Vaughan et al. | |
| 5,907,323 | A | 5/1999 | Lawler et al. | 345/327 |
| 5,907,366 | A | 5/1999 | Farmer et al. | |
| 5,914,746 | A | 6/1999 | Matthews, III et al. | |
| 5,917,481 | A | 6/1999 | Rzeszewski et al. | |
| 5,917,830 | A | 6/1999 | Chen et al. | |
| 5,918,014 | A | 6/1999 | Robinson | 395/200.49 |
| 5,920,700 | A | 7/1999 | Gordon et al. | |
| 5,929,849 | A | 7/1999 | Kikinis | |
| 5,929,850 | A | 7/1999 | Broadwin et al. | |
| 5,936,679 | A | 8/1999 | Kasahara et al. | |
| 5,940,073 | A | 8/1999 | Klosterman et al. | 345/327 |
| 5,940,572 | A | 8/1999 | Balaban et al. | |
| 5,945,988 | A | 8/1999 | Williams et al. | 345/327 |
| 5,951,642 | A | 9/1999 | Onoe et al. | 709/224 |
| 5,959,688 | A | 9/1999 | Schein et al. | |
| 5,960,411 | A | 9/1999 | Hartman et al. | |
| 5,974,222 | A | 10/1999 | Yuen et al. | 386/83 |
| 5,977,964 | A | 11/1999 | Williams et al. | 345/327 |
| 5,986,650 | A | 11/1999 | Ellis et al. | |
| 5,988,078 | A | 11/1999 | Levine | |
| 5,990,890 | A | 11/1999 | Etheredge | |
| 5,990,927 | A | 11/1999 | Hendricks et al. | 348/6 |
| 5,999,912 | A | 12/1999 | Wodarz et al. | |
| 6,002,393 | A | 12/1999 | Hite et al. | 345/327 |
| 6,002,394 | A | 12/1999 | Schein et al. | 345/327 |
| 6,005,562 | A | 12/1999 | Shiga et al. | |
| 6,005,565 | A | 12/1999 | Legall et al. | |
| 6,005,597 | A | 12/1999 | Barrett et al. | 348/1 |
| 6,006,257 | A * | 12/1999 | Slezak | 725/110 |
| 6,008,802 | A | 12/1999 | Iki | |
| 6,011,546 | A | 1/2000 | Bertram | |
| 6,014,137 | A | 1/2000 | Burns | |
| 6,014,502 | A | 1/2000 | Moraes | 395/200.49 |
| 6,016,141 | A | 1/2000 | Knudson et al. | |
| 6,018,372 | A | 1/2000 | Etheredge | 348/569 |
| 6,018,768 | A | 1/2000 | Ullman et al. | |
| 6,020,883 | A | 2/2000 | Herz et al. | |
| 6,020,929 | A | 2/2000 | Marshall et al. | 348/564 |
| 6,025,837 | A | 2/2000 | Matthews, III et al. | 345/327 |
| 6,025,886 | A | 2/2000 | Koda | 348/700 |
| 6,028,599 | A | 2/2000 | Yuen et al. | |
| 6,029,045 | A | 2/2000 | Picco et al. | 455/5.1 |
| 6,035,304 | A | 3/2000 | Machida et al. | |
| 6,047,317 | A | 4/2000 | Bisdikian et al. | |
| 6,049,824 | A | 4/2000 | Simonin | |
| 6,052,145 | A | 4/2000 | Macrae et al. | 348/10 |
| 6,061,060 | A | 5/2000 | Berry et al. | |
| 6,064,376 | A | 5/2000 | Berezowski et al. | 345/327 |
| 6,064,980 | A | 5/2000 | Jacobi et al. | 705/26 |
| 6,067,303 | A | 5/2000 | Aaker et al. | |
| 6,072,460 | A | 6/2000 | Marshall et al. | |
| 6,075,551 | A | 6/2000 | Berezowski et al. | |
| 6,075,575 | A | 6/2000 | Schein et al. | |
| 6,078,348 | A | 6/2000 | Klosterman et al. | 348/10 |
| 6,091,883 | A | 7/2000 | Artigalas et al. | |
| 6,098,065 | A | 8/2000 | Skillen et al. | |
| 6,108,042 | A | 8/2000 | Adams et al. | |
| 6,111,614 | A | 8/2000 | Mugura et al. | 348/569 |
| 6,112,186 | A | 8/2000 | Bergh et al. | 705/10 |
| 6,115,057 | A | 9/2000 | Kwoh et al. | 348/5.5 |
| 6,118,492 | A | 9/2000 | Milnes et al. | 725/52 |
| 6,119,098 | A | 9/2000 | Guyot et al. | 705/14 |
| 6,119,101 | A | 9/2000 | Peckover | |
| 6,122,011 | A | 9/2000 | Dias et al. | |
| 6,125,230 | A | 9/2000 | Yaginuma | |
| 6,133,909 | A | 10/2000 | Schein et al. | |
| 6,141,003 | A | 10/2000 | Chor et al. | |
| 6,147,714 | A | 11/2000 | Terasawa et al. | |
| 6,151,059 | A | 11/2000 | Schein et al. | 348/13 |
| 6,154,203 | A | 11/2000 | Yuen et al. | |
| 6,157,413 | A | 12/2000 | Hanafee et al. | |
| 6,160,545 | A | 12/2000 | Eyer et al. | |
| 6,160,546 | A | 12/2000 | Thompson et al. | |
| 6,160,570 | A | 12/2000 | Sitnik | 348/1 |
| 6,163,316 | A | 12/2000 | Killian | 345/327 |
| 6,172,677 | B1 | 1/2001 | Stautner et al. | 345/352 |
| 6,173,271 | B1 | 1/2001 | Goodman et al. | |
| 6,177,931 | B1 * | 1/2001 | Alexander et al. | 725/52 |
| 6,178,446 | B1 | 1/2001 | Gerszberg et al. | 709/217 |
| 6,181,335 | B1 | 1/2001 | Hendricks et al. | 345/328 |
| 6,186,443 | B1 | 2/2001 | Shaffer | |
| 6,191,780 | B1 | 2/2001 | Martin et al. | |
| 6,202,212 | B1 | 3/2001 | Sturgeon et al. | |
| 6,209,129 | B1 | 3/2001 | Carr et al. | |
| 6,209,130 | B1 | 3/2001 | Rector, Jr. et al. | |
| 6,239,794 | B1 | 5/2001 | Yuen et al. | |
| 6,240,555 | B1 | 5/2001 | Shoff et al. | 725/110 |
| 6,253,203 | B1 | 6/2001 | O'Flaherty et al. | |
| 6,256,071 | B1 | 7/2001 | Hiroi | |
| 6,256,785 | B1 | 7/2001 | Klappert et al. | |
| 6,257,268 | B1 | 7/2001 | Hope et al. | |
| 6,262,721 | B1 | 7/2001 | Tsukidate et al. | 345/327 |
| 6,263,501 | B1 | 7/2001 | Schein et al. | 725/39 |
| 6,263,507 | B1 | 7/2001 | Ahmad et al. | 725/134 |
| 6,268,849 | B1 | 7/2001 | Boyer et al. | |
| 6,275,268 | B1 | 8/2001 | Ellis et al. | |
| 6,279,157 | B1 | 8/2001 | Takasu | 725/22 |
| 6,285,713 | B1 | 9/2001 | Nakaya et al. | |
| 6,286,140 | B1 | 9/2001 | Ivanyi | 725/14 |
| 6,289,346 | B1 | 9/2001 | Milewski et al. | |
| 6,298,482 | B1 | 10/2001 | Seidman et al. | 725/101 |
| 6,312,336 | B1 | 11/2001 | Handelman et al. | 463/40 |
| 6,320,588 | B1 | 11/2001 | Palmer et al. | |
| 6,323,911 | B1 | 11/2001 | Schein et al. | |
| 6,331,877 | B1 | 12/2001 | Bennington et al. | |
| 6,341,195 | B1 | 1/2002 | Mankovitz et al. | |
| 6,342,926 | B1 | 1/2002 | Hanafee et al. | |
| 6,357,042 | B2 | 3/2002 | Srinivasan et al. | |
| 6,363,525 | B1 | 3/2002 | Dougherty et al. | 725/34 |
| 6,381,582 | B1 | 4/2002 | Walker et al. | |
| 6,388,714 | B1 | 5/2002 | Schein et al. | 348/563 |
| 6,389,593 | B1 | 5/2002 | Yamagishi | 725/9 |
| 6,392,710 | B1 | 5/2002 | Gonsalves et al. | 348/578 |
| 6,396,546 | B1 | 5/2002 | Alten et al. | |
| 6,400,407 | B1 | 6/2002 | Zigmond et al. | |
| 6,405,371 | B1 | 6/2002 | Oosterhout et al. | |
| 6,408,437 | B1 | 6/2002 | Hendricks et al. | 725/132 |
| 6,411,308 | B1 | 6/2002 | Blonstein et al. | |
| 6,412,110 | B1 | 6/2002 | Schein et al. | 725/40 |
| 6,418,556 | B1 | 7/2002 | Bennington et al. | 725/40 |
| 6,421,067 | B1 | 7/2002 | Kamen et al. | |
| 6,446,261 | B1 | 9/2002 | Rosser | |
| 6,453,471 | B1 | 9/2002 | Klosterman | 725/41 |
| 6,463,585 | B1 | 10/2002 | Hendricks et al. | 725/35 |
| 6,469,753 | B1 | 10/2002 | Klosterman et al. | 348/906 |
| 6,470,497 | B1 | 10/2002 | Ellis et al. | 725/39 |

| | | | | | | |
|---|---|---|---|---|---|---|
| 6,477,579 | B1 | 11/2002 | Kunkel et al. | 2005/0229214 A1* | 10/2005 | Young et al. ............ 725/58 |
| 6,477,705 | B1 | 11/2002 | Yuen et al. ............ 725/41 | 2005/0244138 A1 | 11/2005 | O'Connor et al. |
| 6,486,920 | B2 | 11/2002 | Arai et al. | 2005/0283796 A1 | 12/2005 | Flickinger |
| 6,498,895 | B2 | 12/2002 | Young et al. | | | |
| 6,515,680 | B1 | 2/2003 | Hendricks et al. ........... 345/716 | FOREIGN PATENT DOCUMENTS | | |
| 6,539,548 | B1 | 3/2003 | Hendricks et al. ........... 725/109 | AU | 731010 | 7/1998 |
| 6,546,556 | B1 | 4/2003 | Kataoka et al. | AU | 733993 | 2/1999 |
| 6,564,378 | B1 | 5/2003 | Satterfield et al. ............ 725/40 | CA | 1030505 | 5/1978 |
| 6,564,379 | B1 | 5/2003 | Knudson et al. | CA | 1187197 | 5/1985 |
| 6,574,424 | B1 | 6/2003 | Dimitri et al. | CA | 1188811 | 6/1985 |
| 6,588,013 | B1 | 7/2003 | Lumley et al. | CA | 1196082 | 10/1985 |
| 6,600,364 | B1 | 7/2003 | Liang et al. | CA | 1200911 | 2/1986 |
| 6,600,503 | B2 | 7/2003 | Stautner et al. | CA | 2151458 | 6/1994 |
| 6,606,128 | B2 | 8/2003 | Hanafee et al. | CA | 2312326 | 6/1994 |
| 6,622,306 | B1 | 9/2003 | Kamada | CA | 2164608 | 12/1994 |
| 6,631,523 | B1 | 10/2003 | Matthews et al. | DE | 2918846 | 11/1980 |
| 6,651,251 | B1 | 11/2003 | Shoff et al. | DE | 3246225 | 6/1984 |
| 6,660,503 | B2 | 12/2003 | Kierulff | DE | 3337204 | 4/1985 |
| 6,665,869 | B1 | 12/2003 | Ellis et al. | DE | 3621263 | 7/1988 |
| 6,687,906 | B1* | 2/2004 | Yuen et al. ............ 725/42 | DE | 3909334 | 9/1990 |
| 6,698,020 | B1* | 2/2004 | Zigmond et al. ............ 725/34 | DE | 19531121 A1 | 2/1997 |
| 6,732,369 | B1 | 5/2004 | Schein et al. | DE | 19740079 A1 | 3/1999 |
| 6,738,978 | B1 | 5/2004 | Hendricks et al. | DE | 19931046 | 1/2001 |
| 6,742,183 | B1 | 5/2004 | Reynolds et al. | EP | 0 239 884 | 10/1987 |
| 6,751,800 | B1 | 6/2004 | Fukuda et al. | EP | 0 396 062 | 11/1990 |
| 6,756,997 | B1 | 6/2004 | Ward, III et al. | EP | 0 401 930 | 12/1990 |
| 6,757,906 | B1 | 6/2004 | Look et al. | EP | 0 408 892 | 1/1991 |
| 6,799,327 | B1 | 9/2004 | Reynolds et al. | EP | 0 420 123 | 4/1991 |
| 6,828,993 | B1 | 12/2004 | Hendricks et al. | EP | 0 424 648 A2 | 5/1991 |
| 6,868,551 | B1 | 3/2005 | Lawler et al. | EP | 0 424 648 A3 | 5/1991 |
| 6,938,208 | B2 | 8/2005 | Reichardt | EP | 0 444 496 B1 | 9/1991 |
| 6,973,669 | B2 | 12/2005 | Daniels | EP | 0 447 968 A2 | 9/1991 |
| 7,003,792 | B1 | 2/2006 | Yuen | EP | 0 550 911 | 12/1992 |
| 7,028,326 | B1 | 4/2006 | Westlake et al. | EP | 0 532 322 | 3/1993 |
| 7,069,576 | B1 | 6/2006 | Knudson et al. | EP | 0 560 593 A2 | 9/1993 |
| 7,266,833 | B2 | 9/2007 | Ward, III et al. | EP | 0 572 090 B | 12/1993 |
| 2001/0001160 | A1 | 5/2001 | Schoff et al. | EP | 0682452 A2 | 11/1995 |
| 2001/0029610 | A1 | 10/2001 | Corvin et al. | EP | 0 725 539 | 8/1996 |
| 2001/0042246 | A1* | 11/2001 | Yuen et al. ............ 725/1 | EP | 0 752 767 A2 | 1/1997 |
| 2001/0047298 | A1 | 11/2001 | Moore et al. | EP | 0 753 964 A1 | 1/1997 |
| 2001/0049820 | A1 | 12/2001 | Barton | EP | 0 762 751 | 3/1997 |
| 2001/0054181 | A1 | 12/2001 | Corvin | EP | 0 772 360 A2 | 5/1997 |
| 2002/0042913 | A1 | 4/2002 | Ellis et al. | EP | 0 775 417 B1 | 5/1997 |
| 2002/0042918 | A1 | 4/2002 | Townsend et al. | EP | 0 784 405 A2 | 7/1997 |
| 2002/0049973 | A1 | 4/2002 | Alten et al. | EP | 0 805 594 B1 | 11/1997 |
| 2002/0059602 | A1 | 5/2002 | Macrae et al. | EP | 0 822 718 B1 | 2/1998 |
| 2002/0073424 | A1 | 6/2002 | Ward, III et al. | EP | 0 880 856 B1 | 2/1998 |
| 2002/0083439 | A1 | 6/2002 | Eldering | EP | 0 784 405 A3 | 3/1998 |
| 2002/0092017 | A1 | 7/2002 | Klosterman et al. | EP | 0 827 340 A2 | 3/1998 |
| 2002/0120933 | A1* | 8/2002 | Knudson et al. ............ 725/42 | EP | 0 834 798 | 4/1998 |
| 2002/0124249 | A1 | 9/2002 | Shintani et al. | EP | 0 848 554 A2 | 6/1998 |
| 2003/0005432 | A1 | 1/2003 | Ellis et al. | EP | 0 849 948 A2 | 6/1998 |
| 2003/0110499 | A1 | 6/2003 | Knudson et al. | EP | 0 851 681 A1 | 7/1998 |
| 2003/0163813 | A1 | 8/2003 | Klosterman et al. | EP | 0 852 442 A2 | 7/1998 |
| 2003/0164858 | A1 | 9/2003 | Klosterman et al. | EP | 0 854 645 A2 | 7/1998 |
| 2003/0188310 | A1 | 10/2003 | Klosterman et al. | EP | 0 905 985 A2 | 3/1999 |
| 2003/0188311 | A1* | 10/2003 | Yuen et al. ............ 725/42 | EP | 0 924 927 A2 | 6/1999 |
| 2003/0196201 | A1 | 10/2003 | Schein et al. | EP | 0 935 393 A2 | 8/1999 |
| 2003/0196203 | A1 | 10/2003 | Ellis et al. | EP | 0 944 253 A1 | 9/1999 |
| 2003/0204847 | A1* | 10/2003 | Ellis et al. ............ 725/42 | EP | 0 963 119 A1 | 12/1999 |
| 2003/0208756 | A1* | 11/2003 | Macrae et al. ............ 725/34 | EP | 0 988 876 | 3/2000 |
| 2003/0208758 | A1* | 11/2003 | Schein et al. ............ 725/42 | EP | 1 095 504 B1 | 5/2001 |
| 2004/0003407 | A1 | 1/2004 | Hanafee et al. | EP | 0 822 718 B1 | 6/2002 |
| 2004/0049787 | A1 | 3/2004 | Maissel et al. | FR | 2662895 | 12/1991 |
| 2004/0139465 | A1 | 7/2004 | Matthews et al. | GB | 1 554 411 | 10/1979 |
| 2004/0168189 | A1 | 8/2004 | Reynolds et al. | GB | 2034995 | 6/1980 |
| 2004/0194131 | A1 | 9/2004 | Ellis et al. | GB | 2126002 | 3/1984 |
| 2004/0194138 | A1 | 9/2004 | Boylan, III et al. | GB | 2185670 | 7/1987 |
| 2005/0155056 | A1 | 7/2005 | Knee et al. | GB | 2256546 | 12/1992 |
| 2005/0157217 | A1 | 7/2005 | Hendricks | GB | 2309134 A | 7/1997 |
| 2005/0198668 | A1 | 9/2005 | Yuen et al. | JP | 58-137334 | 8/1983 |
| 2005/0204382 | A1 | 9/2005 | Ellis | JP | 58-137344 | 8/1983 |
| 2005/0216936 | A1 | 9/2005 | Knudson | | | |

| | | | | | |
|---|---|---|---|---|---|
| JP | 58-196738 | 11/1983 | WO | WO 95/31069 | 11/1995 |
| JP | 58 210776 A | 12/1983 | WO | WO 95/32583 | 11/1995 |
| JP | 59-141878 | 8/1984 | WO | WO 95/32585 | 11/1995 |
| JP | 60-061935 | 4/1985 | WO | WO 96/07270 A | 3/1996 |
| JP | 61-050470 | 3/1986 | WO | WO 96/08109 | 3/1996 |
| JP | 61-074476 | 4/1986 | WO | WO 96/08113 | 3/1996 |
| JP | 62-060370 | 3/1987 | WO | WO 96/09721 | 3/1996 |
| JP | 62-060384 | 3/1987 | WO | WO 96/13932 A1 | 5/1996 |
| JP | 63 234679 A | 9/1988 | WO | WO 96/17467 | 6/1996 |
| JP | 01-307944 | 12/1989 | WO | WO 96/17473 | 6/1996 |
| JP | 02-048879 | 2/1990 | WO | WO 96/21990 | 7/1996 |
| JP | 03063990 | 3/1991 | WO | WO 96/26605 | 8/1996 |
| JP | 04-227380 | 8/1992 | WO | WO 96/31980 | 10/1996 |
| JP | 05-183826 | 7/1993 | WO | WO 96/34467 | 10/1996 |
| JP | 05-284437 | 10/1993 | WO | WO 96/34486 | 10/1996 |
| JP | 06-021907 | 1/1994 | WO | WO 96/34491 | 10/1996 |
| JP | 07-020254 | 1/1995 | WO | WO 96/38799 | 12/1996 |
| JP | 07-050259 | 2/1995 | WO | WO 96/41471 | 12/1996 |
| JP | 07-076592 | 3/1995 | WO | WO 96/41477 | 12/1996 |
| JP | 07-123326 | 5/1995 | WO | WO 96/41478 | 12/1996 |
| JP | 07-147657 | 6/1995 | WO | WO 97/04595 | 2/1997 |
| JP | 07-288759 | 10/1995 | WO | WO 97/07656 | 3/1997 |
| JP | 07-321748 | 12/1995 | WO | WO 97/013368 | 4/1997 |
| JP | 08-32528 | 2/1996 | WO | WO 97/17774 | 5/1997 |
| JP | 08-32538 | 2/1996 | WO | WO 97/18675 | 5/1997 |
| JP | 08-125497 | 5/1996 | WO | WO 97/26612 | 7/1997 |
| JP | WO 96/13935 | 5/1996 | WO | WO 97/31480 | 8/1997 |
| JP | 08-251122 | 9/1996 | WO | WO 97/41673 | 11/1997 |
| JP | 08-275077 | 10/1996 | WO | WO 97/42763 | 11/1997 |
| JP | 09-037172 | 2/1997 | WO | WO 97/48230 | 12/1997 |
| JP | 0903751 | 2/1997 | WO | WO 97/49237 | 12/1997 |
| JP | 09-102827 | 4/1997 | WO | WO 97/49241 | 12/1997 |
| JP | 2838892 | 12/1998 | WO | WO 97/49242 | 12/1997 |
| JP | 2001-213595 | 8/2001 | WO | WO 98/06219 | 2/1998 |
| JP | 2002-279969 | 9/2002 | WO | WO 98/10589 | 3/1998 |
| WO | WO 86/01962 | 3/1986 | WO | WO 98/16062 | 4/1998 |
| WO | WO 87/03766 | 6/1987 | WO | WO 98/17064 | 4/1998 |
| WO | WO 88/04057 | 6/1988 | WO | WO 98/20675 | 5/1998 |
| WO | WO 88/04507 | 6/1988 | WO | WO 98/26569 | 6/1998 |
| WO | WO 89/02682 | 3/1989 | WO | WO 98/26584 | 6/1998 |
| WO | WO 89/03085 | 4/1989 | WO | WO 98/27723 | 6/1998 |
| WO | WO 89/12370 | 12/1989 | WO | WO 98/28906 | 7/1998 |
| WO | WO 90/01243 | 2/1990 | WO | WO 98/31148 | 7/1998 |
| WO | WO 90/15507 | 12/1990 | WO | WO 98/41020 | 9/1998 |
| WO | WO 91/00670 | 1/1991 | WO | WO 98/43183 | 10/1998 |
| WO | WO 91/18476 | 11/1991 | WO | WO 98/47279 | 10/1998 |
| WO | WO 92/04801 | 3/1992 | WO | WO 98/56172 | 12/1998 |
| WO | WO 93/04473 | 3/1993 | WO | WO 99/04561 | 1/1999 |
| WO | WO 93/05452 | 3/1993 | WO | WO 99/07142 | 2/1999 |
| WO | WO 93/11638 | 6/1993 | WO | WO 99/18722 | 4/1999 |
| WO | WO 93/11639 | 6/1993 | WO | WO 99/29109 | 6/1999 |
| WO | WO 93/11640 | 6/1993 | WO | WO 99/30491 | 6/1999 |
| WO | WO 93/23957 | 11/1993 | WO | WO 99/31480 | 6/1999 |
| WO | WO 94/13107 | 6/1994 | WO | WO 99/45700 | 9/1999 |
| WO | WO 94/14281 | 6/1994 | WO | WO 99/45702 | 9/1999 |
| WO | WO 94/14282 | 6/1994 | WO | WO 99/52285 | 10/1999 |
| WO | WO 94/14283 | 6/1994 | WO | WO 99/56466 | 11/1999 |
| WO | WO 94/14284 | 6/1994 | WO | WO 99/56473 | 11/1999 |
| WO | WO 94/21085 | 9/1994 | WO | WO 99/60783 | 11/1999 |
| WO | WO 94/23383 | 10/1994 | WO | WO 99/60789 | 11/1999 |
| WO | WO 94/29811 | 12/1994 | WO | WO 00/04706 | 1/2000 |
| WO | WO 95/01056 | 1/1995 | WO | WO 00/05889 | 2/2000 |
| WO | WO 95/01058 | 1/1995 | WO | WO 00/11865 | 3/2000 |
| WO | WO 95/01059 | 1/1995 | WO | WO 00/16548 | 3/2000 |
| WO | WO 95/06389 | 3/1995 | WO | WO 00/27122 | 5/2000 |
| WO | WO 95/07003 | 3/1995 | WO | WO 00/28734 | 5/2000 |
| WO | WO 95/10910 | 4/1995 | WO | WO 00/33160 | 6/2000 |
| WO | WO 95/15649 | 6/1995 | WO | WO 00/33224 | 6/2000 |
| WO | WO 95/15657 | 6/1995 | WO | WO 00/33560 | 6/2000 |
| WO | WO 95/15658 | 6/1995 | WO | WO 00/49801 | 8/2000 |
| WO | WO 95/19092 A1 | 7/1995 | WO | WO 00/79798 | 12/2000 |
| WO | WO 95/28055 | 10/1995 | WO | WO 01/06784 | 1/2001 |
| WO | WO 95/30961 | 11/1995 | WO | WO 01/15438 | 3/2001 |

| | | |
|---|---|---|
| WO | WO 01/35662 | 5/2001 |
| WO | WO 01/89213 | 11/2001 |
| WO | WO 02/31731 A2 | 4/2002 |

OTHER PUBLICATIONS

U.S. Appl. No. 09/034,934, filed Mar. 4, 1998, Ellis et al.
U.S. Appl. No. 09/217,100, filed Dec. 16, 1998, Reynolds et al.
U.S. Appl. No. 09/330,792, filed Jun. 11, 1999, Knudson et al.
U.S. Appl. No. 09/332,244, filed Jun. 11, 1999, Ellis et al.
U.S. Appl. No. 09/356,268, filed Jul. 16, 1999, Rudnick et al.
272OR Satellite Receiver User's Guide, *General Instrument,* 1991, pp. 58-61.
"Addressable Converters: A New Development at CableData," *Via Cable,* vol. 1, No. 12, Dec. 1981.
Advertisement for "TV Decisions," Cable Vision, Aug. 4, 1986.
Alexander, Michael "Visualizing cleared-off desktops," Computerworld, May 6, 1991, p. 20.
Antonoff, M., "Stay Tuned for Smart TV," Popular Science, Nov. 1990, pp. 62-65.
Baer, R.H, "Innovative Add-On TV Products" IEEE Transactions on Consumer Electronics, vol. CE-25, Nov. 1979, pp. 765-771.
"Bell Atlantic Buys Cable TV Company for $22bn," *Financial Times* (London), Oct. 14, 1993 p. 65.
Bensch, U., "VPV Videotext Programs Videorecorder," IEEE Paper, Jun. 1988, pp. 788-792.
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236.
Brochure, "A New Approach To Addressability," CableData, undated.
Brochure, "Westar and Videotoken Network Present The CableComputer," Revised Aug. 15, 1985 (Planitff's 334).
Brochure, Time Inc., Now, Through the Advances of the Computer Age, You Can Get the Information You Want, When You Want It. Instantly and Conveniently, On Your Home TV Screen, Time Teletext, Time Video Information Services, Inc., undated (V 79167-79175).
Brochure, VTN "Videotoken Network, New Dimension Television," Dec. 1985 (Plaintiff's Exhibit 313).
Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.
Cable Computer User's Guide, Rev. 1, Dec. 1985 (Plaintiff's Exhibit 289).
"Cable Television Equipment," Jerrold Communications Publication, dated 1992 and 1993, pp. 8-2.1 to 8-6 and 8-14.1 to 8-14.3.
Carne, E.B., "The Wired Household," IEEE Spectrum, vol. 16 No. 10, Oct. 1979, pp. 61-66.
Chan, Patrick P., "Learning Considerations in User Interface Design: The Room Model," Publication of the Software Portability Laboratory, University of Waterloo, Ontario, Canada, Jul. 1984.
Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.
"Computer Network: Current Status and Outlook on Leading Science and Technology," Bureau of Science & Technology (Japan), vol. 1, Dec. 1986.
Cox, J. et al, "Extended Services in A Digital Compression System, " *Proceedings from Eleven Technical Sessions: 42nd Annual Convention and Exposition of the National Cable Television Association,* Jun. 1993, pp. 185-191.
Creation/Modification of the Audio Signal Processor Setup for a PC Audio Editor, IBM Technical Disclosure Bulletin, vol. 30, No. 10, Mar. 1988, pp. 367-376.
"D2B-Home Bus Fur Audio and Video," Selektor, Apr. 1990, pp. 10, 12.

Damouny, N.G., "Teletext Decoders—Keeping Up With the Latest Advances," IEEE Transactions on Consumer Electronics, vol. CE-30, No. 3, Aug. 1984, pp. 429-435.
"Dial M for Movie", Funkschau Nov. 1994 Perspektiven, Video on Demand, pp. 78-79. (English language translation attached).
"Digital Video Broadcasting (DVB); DVB specification for data broadcasting," European Telecommunication Standards Institute, Draft EN 301 192 V1.2.1 (Jan. 1999).
DiRosa, S. "BIGSURF Netguide", Jul. 1995, vol. 3.1 (Sections 18,21, and 28—renumbered as pp. 1-27).
"'Duck Tales,'(1987)[TV Series 1987-1990]," Internet Movie Database (IMDB) [Retrieved on Apr. 7, 2007].
Edwardson, S.M., & Gee, A., "CEEFAX: A Proposed New Broadcasting Service," Journal of the SMPTE, Jan. 1974, vol. 83 No. 1, pp. 14-19.
Eitz, Gerhard, "Zukünftige Informations-und Datenangebote beim digitalen Femsehen-EPG Und 'Lesezeichen'," RTM Rundfunktechnische Mitteilungen, Jun. 1997, vol. 41, pp. 67-72.
"Enhanced Content Specification," "ATVEF," from the internet at http://www.atvef.com/library/spec.html, printed Aug. 22, 2001, the document bears a Copyright date of 1998, 1999, 2000.
European Telecommunication Standard, Electronic Programme Guide (EPG); Protocol for a TV Guide using electronic data transmission, by European Telecommunication Standards Institute, Valbonne, France, publication No. ETS 300 707 date of May 1997.
"European Telecommunications Standards: Digital Boradcasting Systems For Television Sound and Data Services; Specification for Service Information (SI) in Digital Video Broadcasting (DVB) Systems," European Telecommunications Standards Institute, Dec. 1994.
"Facsimile Transmissiion," NHK Research Monthly Report, Dec. 1987(Unknown author).
Hartwig, Rautenberg, Bollmann, "Boradcasting and Processing of Program Guides for Digital TV," SMPTE Journal, pp. 727-732, Oct. 1997.
Hedger, J., "Telesoftware: Home Computing Via Broadcast Teletext," IEEE Transactions on Consumer Electronics, vol. CE-25, No. 3, Jul. 1979, pp. 279-287.
Hiroshi Ishii et al, "Clearface: Translucent Multiuser Interface for TeamWorkStation," ECSCW, Sep. 1991, pp. 6-10.
Hiroshi Ishii et al, "Toward an Open Shared Workspace: Computer and Video Fusion Approach of Team Workstation," Communications of the ACM, Dec. 1991, vol. 34 No. 12, pp. 37-50.
Hirotada Ueda et al, "Impact: An Interactive Natural-Motion-Picture Dedicated Multi-Media Authoring System," Communications of the ACM, Mar. 1991, pp. 343-350.
Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.
Installation Guide, "Getting Started 1" Manual, and Remote Control "Quick Reference Guide".
Instructional Manual, "Sonic The Hedgehoge," Sega of America, 1992.
"Interactive Computer Conference Server," IBM Technical Bulletin, vol. 34, No. 7A, Dec. 1991, pp. 375-377.
"Interface Device for Conventional TVs to Improve Functionality," IBM Technical Disclosure Bulletin, vol. 36, No. 7, Jul. 1993, pp. 53-54.
James Sorce, David Fay, Brian Raila and Robert Virzi, "Designing a Boradband Residential Entertainment Service: A Case Study," GTE Laboratories Incorporated, undated, pp. 141-148.
James, A., "Oracle—Broadcasting the Written Word," Wireless World, Jul. 1973, vol. 79 No. 1453, pp. 314-316.
Judice, C.N., "Move Over Cable, Here Comes Video Via Voice Lines," Network World, Sep. 1986, p. 26.
Karstad, K., "Microprocessor Control for Color-TV Receivers," IEEE Transactions on Consumer Electronics, vol. CE-26, May 1980, pp. 149-155.
Kornhaas, W., "Von der Textprogrammierung uber TOP zum Archivsystem," Radio Fernsehen Elektronik, vol. 40, No. 8, Aug. 30, 1991, pp. 465-468, XP 000240875 Veb Verlag Technik. Berlin, DE ISSN: 1436-1574.

Listing of computer code for operating system within the Cable Computer in 1985 (Plaintiff's Exhibit 298).

Listing of computer code for Video HTU Program (Plaintiff's Exhibit 299).

"Lists> What's On Tonite! TV Listings (fwd)," Internet article (On line), Jan. 28, 1995, XP 002378869 [Retrieved on Apr. 28, 2006].

Lowenstein, R.L. and Aller, H.E., "The Inevitable March of Videotex," Technology Review, vol. 88, Oct. 1985, p. 22.

M/A-COM, Inc., "Videocipher II Satellite Descrambler Owner's Manual," dated Feb. 1986, pp. 1-24.

Mack Daily, "Addressable Decoder with Downloadable Operation," Proceedings from the Eleven Technical Sessions, 42nd Annual Convention and Exposition of the NCTA, Jun. 6-9, 1993, pp. 82-89.

Mannes, G., "Smart Screens; Development of Personal Navigation Systems for TV Viewers," Video Magazine, Dec. 1993.

Mar. 19, 1985 letter from G. Knapp of CableData to R. Hansen of Weststar Communications, Inc. (Plaintiff's Exhibit 325).

Markowitz, A. "Companies Jump on Interactive Bandwagon," *Discount Store News*, Dec. 6, 1993, pp. 4 and 131.

McKenzie, G.A., "Oracle—An Information Broadcasting Service Using Data Transmission in the Vertical Interval," Journal of the SMPTE, Jan. 1974, vol. 83 No. 1, pp. 6-10.

Merrell,R.G., "Tac Timer," 1986 NCTA Technical Papers, pp. 203-206.

"MSI Datacasting Systems," TV Communications Journal, Jan. 1973.

Neumann, Andreas, "WDR Online Aufbau und Perspektiven Automatisierter Online-Dienste im WDR," RTM Rundfunktechnische Mitteilungen, vol. 41, pp. 56-66, Jun. 1997.

No subject, "Tom Schauer (tschauer@moscow.com)Thu, Sep. 28, 1995 16:46:48-700," XP-002378870 [Retrieved from the Internet Apr. 28, 2006].

Office Action dated Sep. 8, 2006 re U.S. Appl. No. 10/453,388.

"Open TV fur interaktives Fernsehen," Trend and Technik, 9-95 RFE, p. 100. (English language translation attached).

"Open TV Launches OpenStreamer™ Technology for Broadcasters to Deliver First Ever Real-Time Digital Interactive Television," from the internet at http://www.opentv.com/news/openstreamers_press_final.htm, printed on Jun. 28, 1999, the document bears a copyright date of 1999.

Pfister, Larry T., "Teletext: Its Time Has Come," Prepared For The IGC Videotext / Teletext Conference, Andover, Massachusettes, Dec. 14, 1982, pp. 1-11.

Prevue Guide Brochure, Spring 1994.

"Prevue Networks and OpenTV(R) Agree to work Together on Deploying Interactive Program Guides Worldwide," from the internet at http://www.opentv.com/news/prevuefinal.htm, printed on Jun. 28, 1999.

"Probe XL Brochure, Auto Tote Systems Inc.," (Newark, Delaware) (undated) 57 pgs.

Prodigy Launches Interactive TV Listing, Apr. 22, 1994 public Broadcasting Report.

Rayers, D.J., "Telesoftware by Teletext," 1984 IEEE Conference Papers, vol. 240, p. 323.

"Rewind, reply and unwind with new high-tech TV devices," by Lawrence J. Magid, *LA Times*. This document was printed from the internet on Jun. 6, 1999 and bears a date of May 19, 1999.

Rogers, "*Telcos* v *Cable TV*: The Global View With Markets Converging And Regulatory Barriers Falling, Service Carriers Are Ready To Rumble," Data Communications, Sep. 21, 1995, vol. 24, No. 13, pp. 75-76, 78, 80, XP000526196.

Roizen, Joseph "Teletext in the USA," Society of Motion Picture and Television Engineers Journal, Jul. 1981, pp. 602-610.

Roseville City Council Presentation, Mar. 13, 1985 (Defendant's Exhibit 226).

Ross Peddicord, "New on TV: You Bet Your Horse," *The Sun, Baltimore Maryland* Dec. 15, 1994, 1 pg.

Schlender, B.R., "Couch Potatoes! Now It's Smart TV," Fortune, Nov. 20, 1989, pp. 111-116.

Schmuckler, Eric "A marriage that's made in cyberspace (television networks pursue links with online information services)," May 16, 1994 MEDIAWEEK, v. 4, No. 20, p. 22(3).

Sealfon, Peggy, "High Tech TV," Photographic,Dec. 1984.

"StarSight Interactive Television Program Guide III" Jim Leftwich and Steve Schein, Functional/ Interactional Architecture Specification Document, Orbit Interaction, Palo alto, California, Published before Apr. 19, 1995.

"StarSight Interactive Television Program Guide IV" Jim Leftwich and Steve Schein, Functional/ Interactional Architecture Specification Document, Orbit Interaction, Palo Alto, California, Published before Apr. 19, 1995.

Sunada, K. et al, "Teletext Color Television Receiver Model C-29M950, C26M940," NEC Home Electronics , NEC Giho, 1987.

Sussman, A. "GTE Tunes In to Home TV Shopping," *PC Week*, Jun. 28, 1988, p. C15.

Tech Notes: Product Updates from M/A-COM Cable Home Group, "Videocipher Owner's Manual Update," Issue No. 6, Feb. 1986.

Technical White Paper, "Open TV™ Operating Environment," (© 1998 OpenTV Inc.), pp. 1-12.

Technological Examination & Basic Investigative Research Report on Image Databases, Japan Mechanical Engineering Orangization Int'l Society for the Advancement of Image Software, Japan, Mar. 1988.

Technology: Turn on, tune in and print out—An Experimental interactive television service is set to alter our viewing habits, *Financial Times* (London), Oct. 14, 1993, p. 11.

The New Media and Broadcast Policy: An Investigation & Research Conference Report on Broadcasting Diversification, Radio Regulatory Bureau, Japan Ministry of Posts & Telecommunications, Mar. 1982.

Transcript of the Deposition of John Roop, Oct. 1996, pp. 186-187.

Trial testimony of Michael Axford, *Prevue Interactive, Inc. and United Video Satellite Group, Inc.* v. *Starsight Telecast, Inc.*, May 9, 1998, pp. 186-187 , 295-315, and 352-357.

"TV Guide Online Set for Fall", Entertainment Marketing Letter, Aug. 1994.

"TV Listings Functional Spec.," Time Video Information Services, Inc., undated.

"Using StarSight 2," Instruction Manual, StarSight Telecast, Inc., Starsight CB 1500 Customer Letter, 1994.

UV-133 Cont. 6 Declaration Under 37 C.F.R. § 1.132 of Richard E. Glassberg, singed Oct. 20, 2006, filed Oct. 24, 2006.

Various publications of Insight Telecast, 1992 and 1993.

Veith, R.H., "Television's Teletext," Elsivier Science Publishing Co., Inc, 1983, pp. 13-20, 41-51.

Videocipher Stipulation, May 1996.

VideoGuide, "VideoGuide User's Manual," pp. 1-28 (p. 11 is the most relevant).

W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.

Windows 98 Feature Combines TV, Terminal and the Internet, *New York Times*, Aug. 18, 1998.

Wittig et al,"Intelligent Media Agents in Interactive Television Systems," Proceedings of the Interna-tional Conference on Multimedia Computing and Systems, Los Alamitos, CA, US, May 15-18, 1995, pp. 182-189, XP 000603484.

Yee Hsiang Chang et al., "An Open-Systems Approach to Video on Demand," *IEEE Communications Magazine*, May 1994, pp. 68-80.

\* cited by examiner

CHANNEL DATA TABLE

| Offset | 7 | 6 | 5 | 4 | 3 | 2 | 1 | 0 | Offset |
|---|---|---|---|---|---|---|---|---|---|
| 0x00 | colspan=8 | TYPE = 0x01 | | | | | | | |
| 0x01 | colspan=8 | NBR BLOCKS | | | | | | | |
| 0x02 | colspan=8 | 0x00 | | | | | | | |
| 0x03 | colspan=8 | NBR CHANNELS | | | | | | | |
| 0x04 | MSB | colspan=6 | CHANNEL ID | | | | | LSB | 0x00 |
| 0x06 | DPF | ICF | NDF | /// | /// | /// | NF | TMSB | 0x02 |
| 0x07 | colspan=8 | TUNE CHANNEL NBR | | | | | | | 0x03 |
| 0x08 | colspan=8 | TRANSPONDER NBR | | | | | | | 0x04 |
| 0x09 | colspan=8 | SATELLITE NBR | | | | | | | 0x05 |
| 0x0A | /// | /// | colspan=2 SOURCE | | colspan=3 CHANNEL TYPE | | | NMSB | 0x06 |
| 0x0B | colspan=8 | NATIVE CHANNEL NBR | | | | | | | 0x07 |
| 0x0C | colspan=8 | NAME MASK BITS | | | | | | | 0x08 |
| 0x0D | colspan=8 | FAVORITES LINK | | | | | | | 0x09 |
| 0x0E | MSB | colspan=6 SHOWLIST HANDLE TABLE HANDLE | | | | | | LSB | 0x0A |
| 0x10 | MSB | colspan=6 NAME AFFILIATION STRING | | | | | | LSB | 0x0C |
| 0x18 | MSB | colspan=6 DUPLICATE CHANNELS HANDLE | | | | | | LSB | 0x14 |

Fig. 5

SHOW DESCRIPTION ENTRY

|      | 7 | 6 | 5 | 4 | 3 | 2 | 1 | 0 |
|------|---|---|---|---|---|---|---|---|
| 0x00 | TYPE=0x60 NBR BLOCKS |||||||| 
| 0x01 | CMPF | CCF | SF | BWC | RF | REF CNT MSBs |||
| 0x02 | REFERENCE COUNT ||||||||
| 0x03 | MSB THEME INDEX ID ... LSB ||||||||
| 0x05 | CRITICS RATING | | | | MPAA ||||
| 0x06 | TRAITS MASK BITS ||||||||
| 0x07 | YEAR PRODUCED ||||||||
| 0x08 | SHOW DESCRIPTION TEXT ||||||||

*Fig. 8*

SHOW TITLE ENTRY

|      | 7 | 6 | 5 | 4 | 3 | 2 | 1 | 0 |
|------|---|---|---|---|---|---|---|---|
| 0x00 | TYPE=0x50 NBR BLOCKS ||||||||
| 0x01 | CMPF | CCF | SF | BWC | | REF CNT MSBs |||
| 0x02 | REFERENCE COUNT ||||||||
| 0x03 | MSB THEME INDEX ID ... LSB ||||||||
| 0x05 | SHOW TITLE TEXT ||||||||

*Fig. 7*

| CH 1 | SHOW A |
| CH 2 | SHOW B |
| CH 3 | SHOW C |

ELECTRONIC PROGRAM GUIDE SYSTEM WITH ADVERTISING MESSAGES IN POP-UPS

BACKGROUND OF THE INVENTION

The present invention generally relates to television schedule information displayed on a TV screen as an electronic programming guide, and more particularly to a system and method for accessing guide reformatting functions without leaving the guide.

As the number of television stations in a metropolitan area or on a cable network has increased, the number of programs of potential interest that are presented to a viewer has risen dramatically. With the use of dish antennas capable of receiving direct satellite signals, the multitude of programs available to the viewer has further increased.

Additionally, television faces a digital future that will see the merger of television and PC technology. The television set of the future will include a micro-computer, a modem for interconnectivity with other computers over networks, intranets, and the internet, and be connectable to computer peripherals such as printers. Such capabilities as near "video on demand" (NVOD), "video on demand", "access to the world wide web", "audio on demand", etc. will present the viewer with a plethora of information and bandwidth.

As has become increasingly evident, information overload can actually reduce the usefulness of the information delivered. Accordingly, a great challenge exists to provide an interface that manages and provides an intelligent, user-friendly interface to the information available.

Consequently, television schedule systems that are provided directly on the viewer's television screen have been developed to assist the viewer in sorting through these various programs and determining which programs to watch or record. One such television schedule system is disclosed in commonly assigned U.S. Pat. No. 5,353,121 (Young et al.), the complete disclosure of which is hereby incorporated by reference. In one embodiment of Young, the television schedule includes a series of menu screens having an array of cells corresponding to different television programs. The viewer may scroll through the cells to view which television programs are being presented on various channels at various times. In addition, the viewer may select certain cells to obtain more information on the associated program or to pull up other submenus with additional options.

The recent development of television schedule systems, such as the above described patent to Young, have created many new challenges. One such challenge is utilizing the EPG to present advertising and other information to the viewer when the EPG is activated.

Typically, advertisements are displayed in small rectangular areas of the EPG. However, for EPG systems including browsing and grazing features the viewer often doesn't activate the EPG when casually surfing through available channels. Accordingly, new techniques for displaying advertising and other information utilizing an EPG display are being actively pursued.

SUMMARY OF THE INVENTION

According to one aspect of the present invention, an advertising/message window is provided in browsing and grazing pop-ups to provide messages when the viewer is browsing or grazing.

According to another aspect of the invention, the content of the messages displayed in the browsing or grazing pop-up windows is controlled by the EPG generating system.

Other features and advantages of the invention will be apparent in view of the following detailed description and appended drawings.

BRIEF DESCRIPTION OF THE DRAWINGS

FIGS. 5 to 10 are schematic diagrams of data structures in the database; and

DESCRIPTION OF THE PREFERRED EMBODIMENTS

Overview of an EPG System

Advertising images may be stored in EPG database or received from an external source. The grazing/browsing pop-up format includes graphics objects stored in memory with constant areas generated by data stored in ROM and variable areas for depicting text and graphics based on updatable data stored in database or provided in realtime.

The pop-up includes a variable area for displaying advertising, or other messages, having content stored in the ad list data structure described in detail below.

Figure 2:
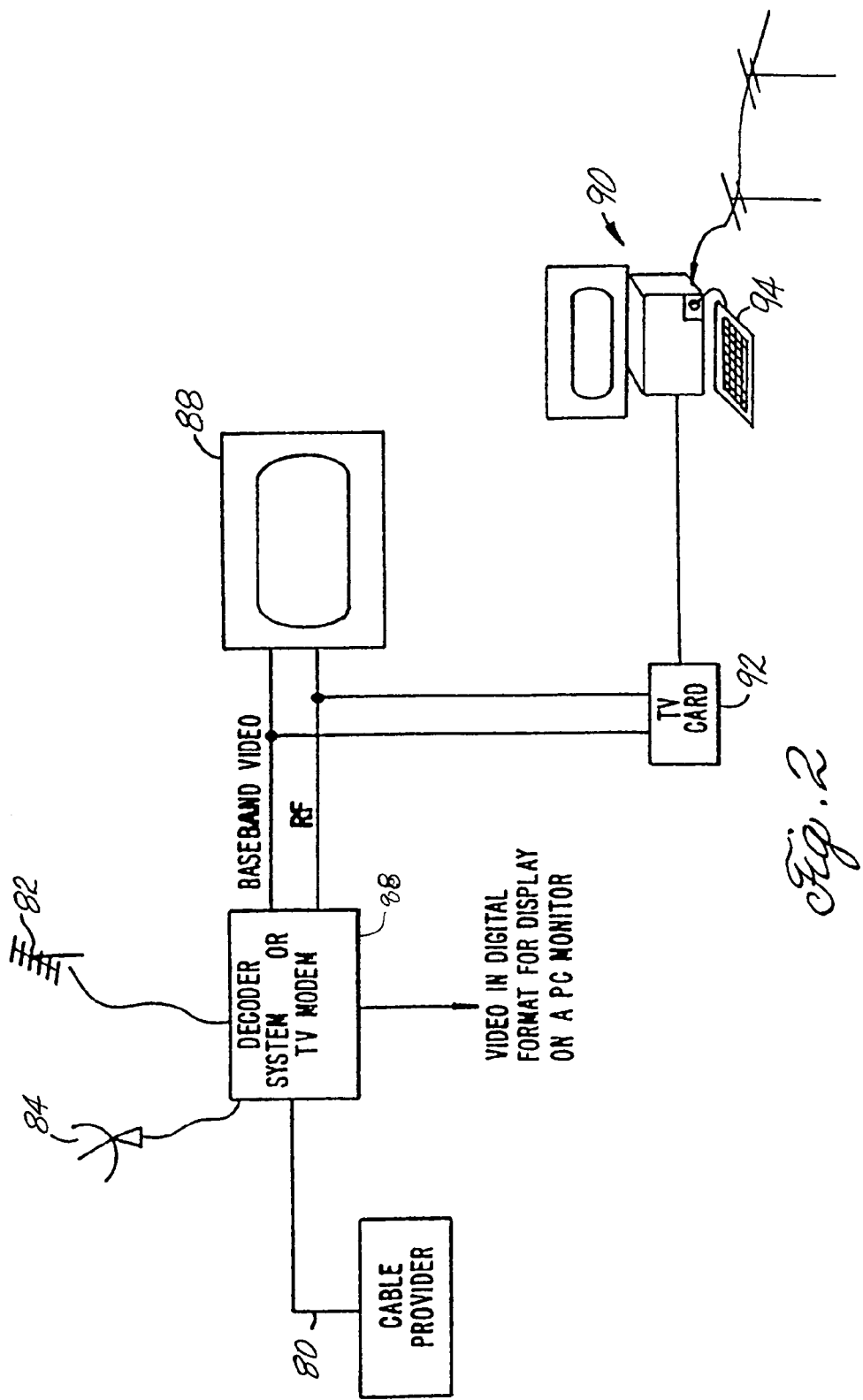
FIG. 2 is a block diagram of a TV system.

In a preferred embodiment, the electronic program guide of the invention may be implemented either on a personal computer, a PCTV, a television connected to a set-top box, or a television including a custom board. However, the invention is not limited to any particular hardware configuration and will have increased utility as new combinations of computers and television systems are developed. In the following any of the above will sometimes be referred to as a "TV system". Block diagrams of representative TV systems are depicted in FIG. 2. Details of implementation are not depicted because the invention is not limited to any particular TV system.

As is well known, the picture to be displayed may be transmitted as an analog signal, for example according to the NTSC standard utilized in the United States, or as a digital signal modulated onto an analog carrier. The signals may be received over a cable or via an antenna or satellite dish. Typically, television sets are designed to receive analog signals and computer display devices are designed to display pictures encoded in a digital format. However, the decoder system converts the digital data to an analog signal for display on a television set and TV modems can format analog TV signals for display on a monitor.

In FIG. 2, analog or digital TV signals, received via cable 80, antenna 82, or satellite dish 84, are provided to a television system. If the signal is from a digital broadcast service, then a decoder in a television system 88 converts the signal to baseband video and audio or channel 3/4 RF. If the signal is an analog signal it is passed through as a live video output. The television system 88, depending on its configuration, receives selected ones of the outputs and displays the received program.

A PCTV 90 includes a TV card 92, connected to either live video, baseband video, or channel 3/4 output, digitizes the video image and displays the video image in a resizable window on the computer monitor. The PCTV includes an input device, such as a keyboard 94 and is also coupled to land telephone lines by a modem.

If the received signal is an analog TV signal the TV card of the PCTV digitizes the analog signal and extracts included information from the vertical blanking intervals. On the other hand, if the signal is a digital signal separate audio, video, VBI (vertical blanking information such as closed caption, teletext, and program related information), program guide, and conditional access information are provided as separate bitstreams. The video and audio bitstreams for programs are converted to a format for display and the program guide information is processed to form a program guide database. The processor, executing software stored in memory, generates interactive electronic program guide images and images of received programs. The guide can be used to interact with and control programs displayed in the window.

A television system configured to display an electronic program guide such as a guide provided by StarSight Telecast includes an on-screen display controller and other hardware described below. If a standard analog broadcast signal is received, program guide data is extracted from the VBI by a VBI data slicer and processed to form a program database. If a DBS digital signal is received, either from a satellite or cable, VBI and program data are provided in separate bit streams. The program guide images are either generated locally or remotely and provided to an on-screen display controller. Interactivity is provided via a remote control.

Alternatively, the program guide can be displayed on a computer monitor that interactively controls the television set through, for example, an IR interface, including an IR blaster, to generate IR codes to control the television and/or a VCR.

If the electronic guide database is generated locally, the system for creating the electronic programming guide must receive television schedule information and process the received information to create a database. Thus, the system requires a data reception unit, a processor, memory to store program code and a database, an on-screen display generator (OSD), and a control interface for tuning to selected channels.

In one preferred embodiment, the schedule information is transmitted as a set of short commands of specified formats. Different commands communicate information such as a show schedule for a given channel, the title of each show in the schedule, descriptions and information attributes about each show in the channel. Thus, information for a show to be broadcast at a particular time is transmitted in several commands. ID numbers in the commands facilitate organizing the information into a relational database utilizing database engine (DBE) software stored in memory and executed by the processor.

Figure 3:
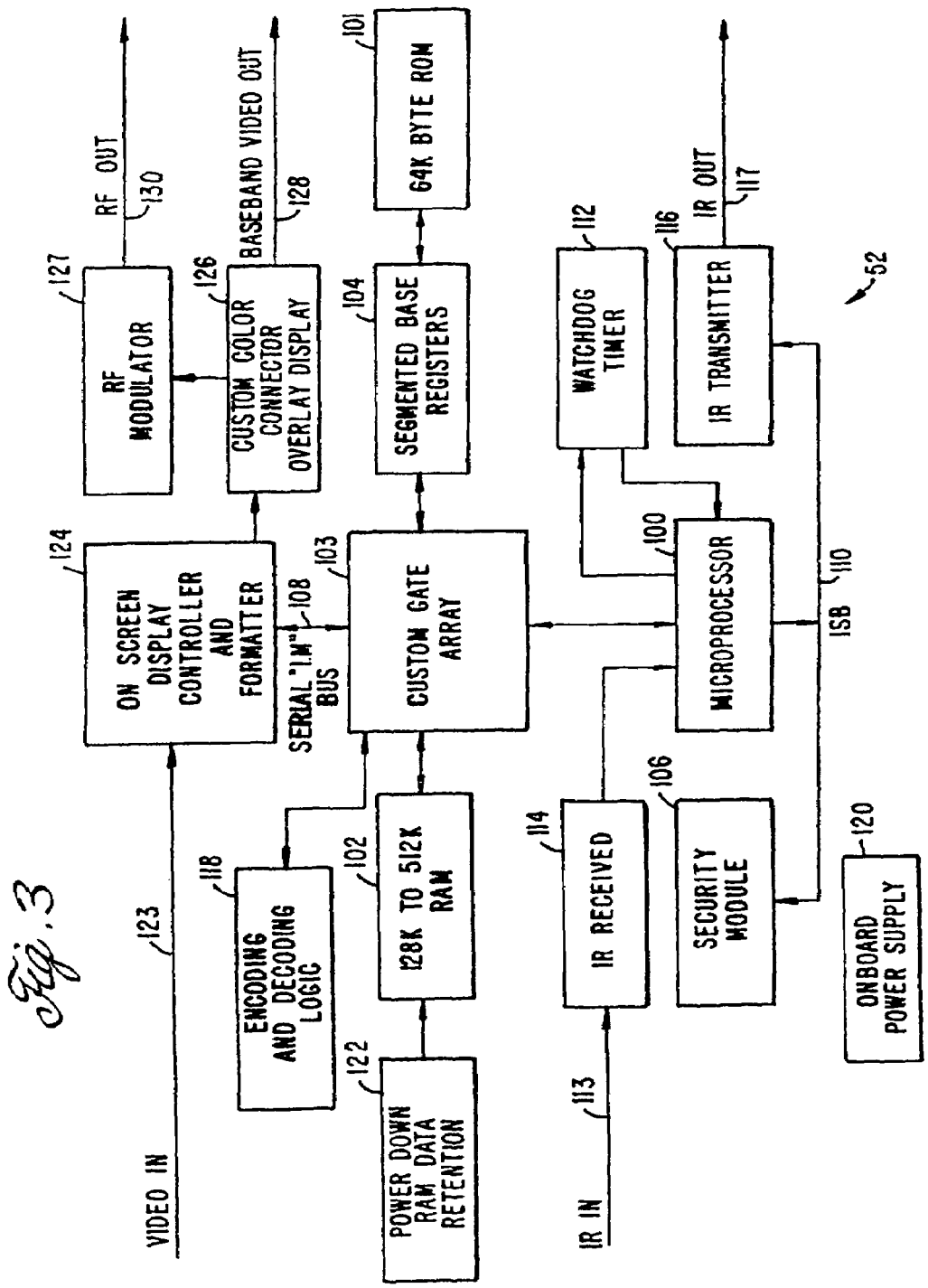
FIG. 3 is a block diagram of a hardware unit for generating an on-screen electronic programming guide (EPG)

In a preferred embodiment, a board is included at a viewer's television set and the database is stored locally and commands are transmitted in the VBIs of programming on a designated channel, for example PBS. An example of a board for receiving program guide information, generating program guide database, displaying the program guide, and interactively controlling the program guide is depicted in FIG. 3. The commands are transmitted to the board in the vertical blanking intervals of programming broadcast on a designated channel.

Alternatively, the commands could be transmitted to the local unit over land telephone lines. Additionally, as described below, in some systems the database is built remotely and the guide itself is transmitted to the local unit.

Figure 4:
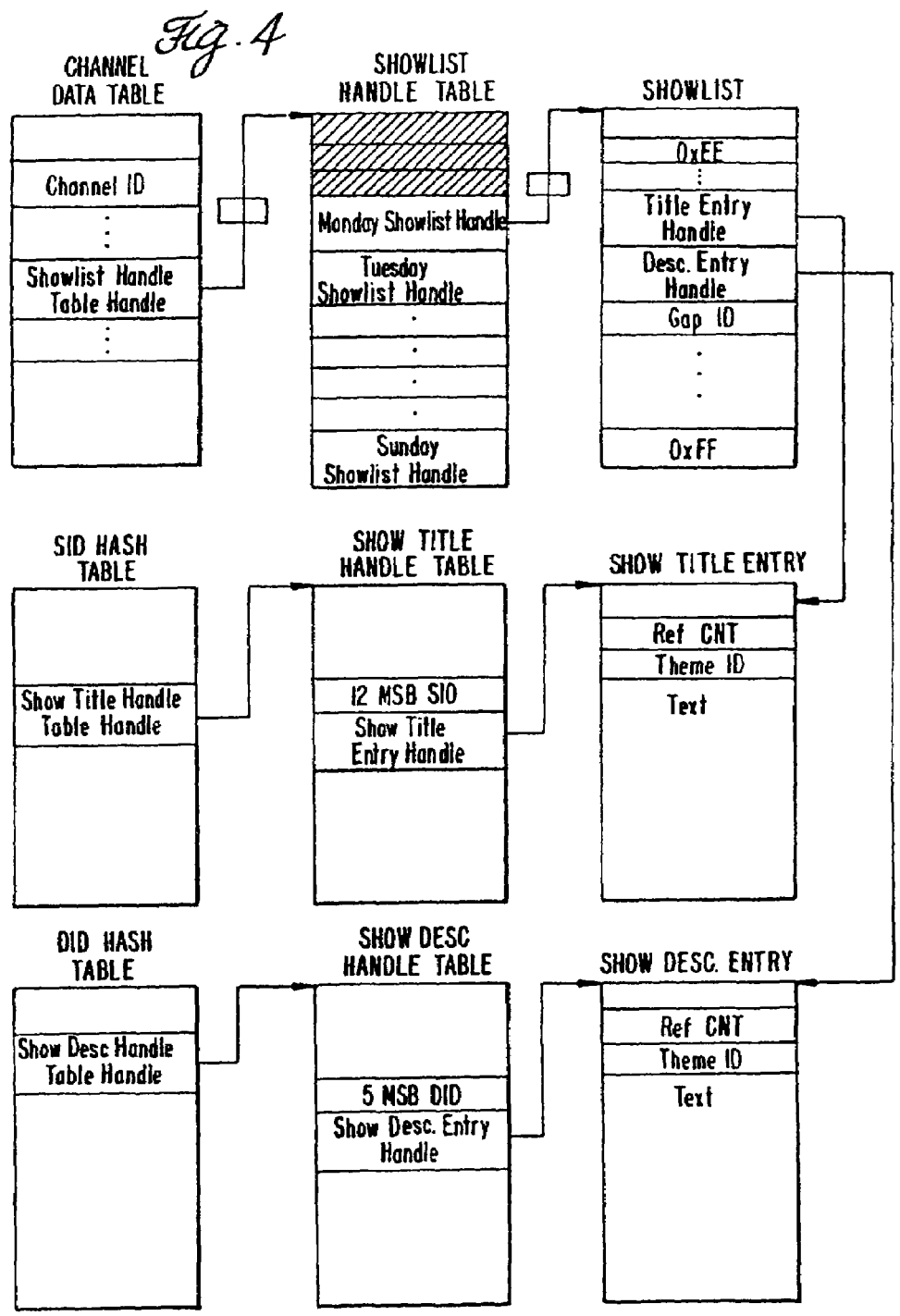
FIG. 4 is a schematic diagram of the hierarchical database utilized to generate the EPG.

The database engine builds a hierarchical database in the RAM. The hierarchical structure of the database is depicted in FIG. 4. The database is structured internally as schedule data structures and theme data structures linked by handles and handle tables. Each handle is an index to a handle table which contains pointers to blocks of memory where items of the database are stored.

In another embodiment, for example a DSS system, program guide data is transmitted as a bit stream that is processed by the database engine.

Additionally, a N.E.W.S. (news, entertainment, weather, and sports) database has been developed. Commands including story text and story IDs are transmitted. Links from the program guide to stories related to a program can be created and the related stories can be accessed from the guide.

An advertisement database is also created from commands including advertising text and logos including IDs for linking the ads to shows displayed in the EPG. The user may access the advertising information directly from the guide.

An internet database is also created from commands including URLs to internet sites related to programs displayed on the EPG. If the viewer is viewing the EPG on a platform that is Web enabled, e.g., WebTV, a PC, or PCTV, then a linked site can be accessed directly from the EPG.

Additionally, a graphics program module builds various displays utilizing schedule, show title, and other information from the database. If the OSD controller operates in the character mode the display is a grid of character codes which are transferred to the OSD controller which generates the on-screen display.

An input-response user interface program module responds to user input to generate new displays responsive to the particular input. In one preferred embodiment, the user utilizes an input device, e.g., a remote control, mouse, or keyboard, to place a pointer over a part of the current display and click. The input-response module responds to the position of the pointer and the particular display currently displayed to generate a responsive display or take a particular action. In another preferred embodiment the user interface responds to function buttons on a remote control. Specific examples will be described below.

Detailed Description of the EPG System

Board Description

FIG. 3 is a block diagram an embodiment of the electronic hardware unit 52 utilized to perform the electronic on-screen schedule display and other functions. The particular hardware unit 52 depicted is for TVRO (TV Receive Only) customers having home satellite dishes for television viewing. This unit is coupled in series with existing customer TVRO equipment.

In FIG. 3, the unit receives Baseband Video in 123 from the customer TVRO system. The unit optionally outputs Baseband Video out 128 or channel 3/4 RF out 130. The unit includes an 8-bit microprocessor 100, 64 bytes of code ROM 101, 512K of RAM 102 for program data storage, a custom gate array 103, segmented base registers 104 for fast memory data manipulation, security logic 106 for decoding incoming encrypted data, a serial bus 108 for display controller interface, serial bus 110 for inter-processor communication, watchdog timer 112 for error recovery, IR input 113, IR transmitter circuits 116 for TV, VCR control, IR output 117, CRC-32 encoding and decoding logic 118, on-board power supply 120, video input 123, On-Screen Display Controller and Formatter 124, custom color converter 126, RF modulator 127, choice of Baseband Video or RF outputs 128 or 130. A power down RAM data retention 122 retains the power to RAM 102.

The on-screen display controller and formatter (OSDCF) 124 functions as an I/O controller, an on-screen display controller (OSD), and also as a closed-caption data (CCD) VBI data slicer. The VBI (vertical blanking interval) is a dead space in a TV signal that allows a television signal to reposition the scanning electron beam from the bottom to the top of the screen. Digital data, for example close-captioned data, is modulated onto the carrier signal during the VBI.

The OSDCF 124 includes an analog-to-digital convertor (ADC) which digitizes the incoming baseband video and extracts digital information transmitted in the VBIs. As explained more fully below, messages for transmission to the database are transmitted in the VBIs. These messages are transferred to the processor 100 which executes a data base engine process to build or update the database.

The OSD part of the OSDCF 124 includes cache memory, character memory, timing functions, and an external RAM. The OSD reads high level graphic commands sent from the processor 100 and stores graphic information in the RAM. The OSD outputs red (R), green (G), blue (B), graphic data which is used to generate a local video signal. Depending on the state of the user input interface, described below, the OSD local video output or the incoming live video will be displayed.

Accordingly, screen display graphic data generated by the database engine is transferred to the RAM of the OSD which the generates a local video signal that causes the display screen to be displayed on the television screen.

Scheduling Data Structures

The DBE builds a hierarchical database in the RAM. The hierarchical structure of the database is depicted in FIG. 4. The database is structured internally as schedule data structures and theme data structures linked by handles and handle tables. Each handle is an index to a handle table which contains pointers to blocks of memory where structures of the database are stored.

The hierarchy for the schedule data structures, in descending order, is:

| | |
|---|---|
| Channel Data Table: | contains subscriber unit's list of channels; |
| Show List: | contains time slots for each show scheduled to be broadcast for a channel; |
| Show Title: | contains the title text and show title attributes; |
| Show Description: | contains show's ratings, attributes, and description text. |

A channel data table, depicted in FIG. 5, is the highest data structure in the hierarchy. This table includes an entry for each channel received by the subscriber unit. The entries in the channel data table are changed infrequently and are determined by the location of the subscriber unit and type of services received. Each channel data table entry includes information concerning the channel and a handle to a show list handle table for the channel.

Figure 6:
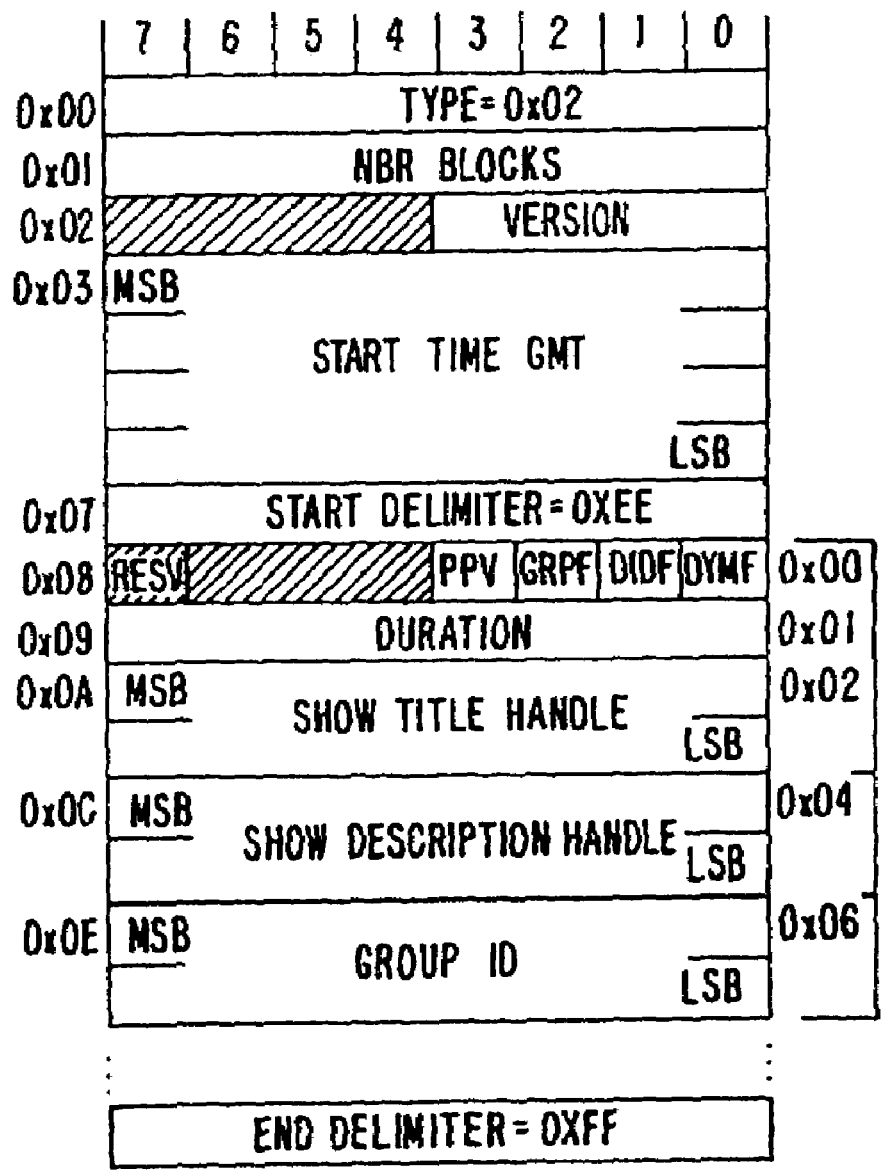

The next data structure in the hierarchy is the show list depicted in FIG. 6. The show list includes a start time typically being midnight GMT and 24 hours of scheduling. The channel's schedule is given by an ordered sequence of show slots, with a show slot for each show to be broadcast by a particular channel for a particular day. Each slot includes a duration, show title handle, and show description handle. Finding an entry corresponding to a given start time requires the entries to be scanned, in order, from the beginning of show list and adding duration values.

The database, when fully constructed, holds a week's worth of show lists for each channel. The days of the week are accessed by incrementing the show list handle by two bytes. The show lists are updated each day at midnight GMT, with the show list for the day just completed being deleted and the show list for same day next week being added to the database.

The next data structures in the schedule hierarchy are the show title entries, depicted in FIG. 7, and show description entries, depicted in FIG. 8. For a given show slot the show title entry and show description entry are accessed utilizing the handles included in the slot. The show title and show description entries are stored in a memory pool divided into blocks. Each show title is identified by a unique 20-bit show identification number (SID) and each show description is identified by a unique 20-bit number assigned at the head end. The show title handles are based on the SID and the show title handles are offsets into a show title handle table. The entry in the show title table accessed by a particular show title handle includes the address of the first block in the memory pool where the show title entry is stored. Similarly, the show description handle table entry accessed by a show description handle stores the address of the first block in the memory pool where the show description entry is stored.

Each show title entry includes a theme index ID and the text of the show title. Typically, a single show title entry will be referenced by many show lists for different channels, days, and times. Thus, by utilizing handles in the show lists all show lists reference a single show title entry in memory so that memory is efficiently used. Many show title entries have a long life because the show titles may be for series that are broadcast over long periods of time and may be referenced by many show lists since many shows are broadcast by multiple channels.

Each show description entry includes a theme index ID, critic's rating, MPAA rating for the show, traits mask bits, year produced, and show description text. Show description entries tend to have a shorter life than show title entries because a description is only valid for a particular episode of a series.

Schedule Search

To obtain schedule information for a particular time and to display the schedule information in the programming grid requires the following steps. For each channel in the channel list, the show list for the day is accessed and scanned. Horizontal blocks for the channel are sized according to the duration of the show slots including and following the selected time. The show title entry referenced by each show slot is accessed and the show title is displayed in the horizontal block corresponding to the show slot.

Favorite Channel Lists

Figure 9:
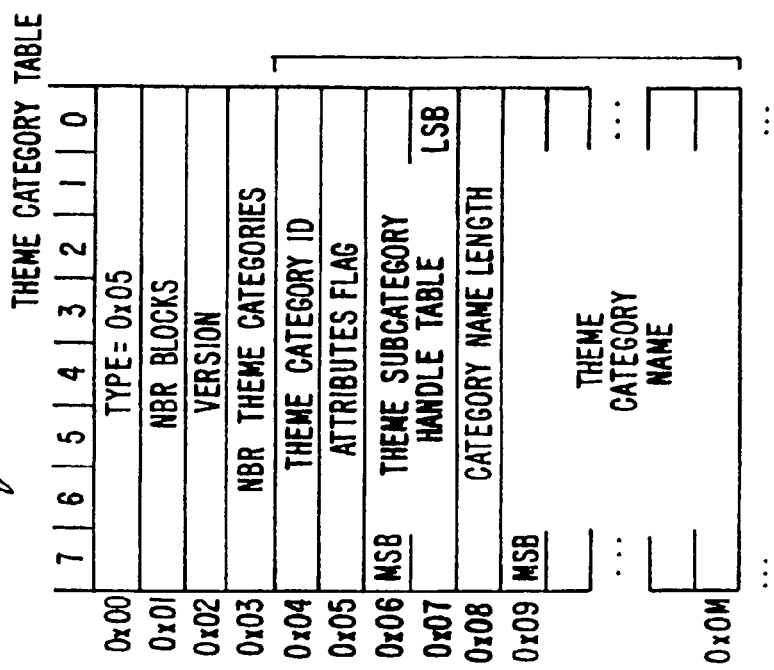

Referring back to FIG. 9, every entry in the channel data table includes a FAVORITE LINK field. This field includes a link to a next favorite channel and is utilized to form an ordered, linked list of channels in an order determined by the user.

The user interface and database engine provide screens to facilitate the ordering and selection of channels to be displayed in the guide. A link to the first channel in an ordered channel list is stored in memory. This link is utilized to access the channel table entry for the most favorite channel. The FAVORITE LINK in that channel is accessed and utilized to access the channel table entry for the next favorite channel and so on until a designated delimiter value, e.g., 0x00, indicates the end of the favorite channel list.

The capability of having more than one favorites list can be supported by having multiple FAVORITE LINK fields stored in each channel table entry.

Theme Data Structures

A powerful feature of the database is the ability to group shows by theme. The theme IDs stored in the show title and show description entries are utilized to match particular shows to particular themes. For example, a viewer may want to see a listing of all comedy movies.

Figure 10:
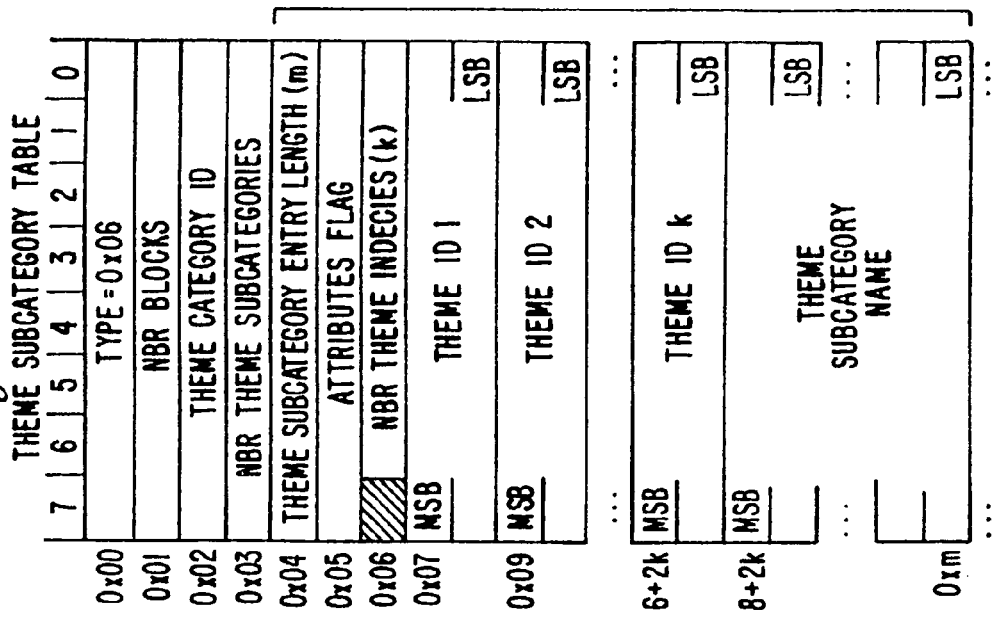

Each primary category, movies in the example above, has a theme category entry included in a theme category table, depicted in FIG. 10. A theme category entry includes a theme category ID, a handle for the subcategory handle table, and the theme category name. The theme category ID is used to identify theme sub-categories, comedy in the example above, for this primary category.

There is a theme sub category table, depicted in FIG. 10, for each primary category. The table contains entries for each theme sub-category contained in a primary theme category. Each table entry includes the theme IDs corresponding to the sub-category entry and the name of the sub-category.

Theme Search

When the viewer initiates a search for a particular type of show, for example a comedy movie, each channel is inspected and theme IDs of each show listed are compared to theme IDs stored in the comedy entry of the theme sub-category table corresponding to the movie primary category entry. Information about shows with matching theme IDs is stored in a theme search data structure in a user interface local buffer.

The theme search function requires two calls to the database. The first of these calls initializes the theme search data structure to the first show that matches the theme category for a specific channel entry, including the shows time offset from the search time. The second call will then find the next matching show after a particular offset time, updating the theme search data structure and returning the offset to the next show.

The basic algorithm for theme user interface access is:

1. for a given starting time, for each channel entry, find the first show that matches the theme criteria on or during this time and create a list. Keep track of the channels that had matches;
2. sort the list of shows in time order;
3. find the channel with the earliest show in the sorted list;
4. place this earliest show into the user interface search list;
5. for the channel with the earliest show, request the next show that matches the theme criteria and updated offset time;
6. repeat steps 2-4 until all shows have been located or other specified limit is reached (i.e. search may be for a limited number of matches).

The shows for the selected category are then displayed in time order.

Ad and N.E.W.S. Data Structures

An ad list data structure is similar to the show list. It includes a start time and 24 hours of ad scheduling. The ad list is regionalized and includes an ad slot for each ad to be broadcast for a given day. The ad slot includes a duration and an Ad ID utilized to access an ad entry.

Each add entry includes an ad banner text field, an ad text field, and a pointer to an ad logo, if appropriate. The ad logo includes a graphics file to be displayed with the ad.

The ad entries, include the ad banner text and ad text.

Similarly, a N.E.W.S. (news, entertainment, weather, and sports) database can be stored. The structure is similar to above described databases with text entries updated to reflect the various topics.

Building the Database

The data base is built by a data base engine software module operating on the processor. Messages comprising discrete commands are received by the database engine. Examples of commands include a Region Command which specifies channels available for a particular subscriber unit to be included in the Channel Data Table; a Channel Data command including information utilized to form the entries in the Channel Data Table; and Showlist, Show Title, and Show Description commands including SIDs and DIDs referencing areas in memory. The database engine selects only Showlist Commands relevant to channels included in the Channel Table for further processing.

The data base engine creates storage locations in memory for all SIDs and DIDs included in any Showlist. Information included in commands having matching SIDs or DIDs is written to the referenced memory area. In practice the SIDs and DIDs are processed by a hashing system for more efficient searching.

The messages may be transmitted to a subscriber unit in various ways. A system for receiving messages in the VBIs of broadcast programming has been described above. In a DBS system the messages may be transmitted in a dedicated bit stream.

In a DBS system video baseband signals are digitized, compressed, and modulated onto analog carrier signals. Because of advances in the art of compression, a carrier once used to transmit a single program can now transmit four programs. Typically, in addition to video signals other bitstreams encoding information such as audio, VBI (vertical blanking information data such as closed caption and teletext), program guide information, and conditional access information, are provided as separate bitstreams, multiplexed into a composite bit stream, and modulated onto a carrier signal.

Alternatively, the database itself may be transmitted in a digital data stream. For example, in DSS the program guide information is transmitted in blocks of 3 hours of programming for 36 channels. Programming is digitally modulated onto different bands. As depicted in FIG. 6, a satellite has several transponders 500 simultaneously transmitting on different bands. Several channels can be modulated onto a single band utilizing digital compression techniques. A bit stream including the current programming is carried by all bands. However, future programming for different blocks of channels is transmitted on different bands. The blocks are transmitted as a carousel or endless loop so that there may be a delay before a particular time band is received.

A decoder at the viewer's location receives 16 carriers and controls a tuner/demodulator to select one carrier. The carrier is sampled, decoded, error-corrected, and demultiplexed to separate the various bit streams. The decoder includes video decoder chips which decompress compressed video to reconstruct pictures of virtually any size.

When the viewer accesses the guide the block for that time period is loaded into memory so that the user can interact with the guide. For a future time and different channel there may be a time delay. For example, if the current programming block were B1 and the block currently received is B4 the user must wait for blocks B5, B6, and B7, to be transmitted before the current programming can be received and displayed. The viewer would wait for a time delay equal to the sum of time durations for transmitting each block, i.e., $d5+d6+d7$. If the program guide block is modulated onto a different band the cable box must tune to the band and wait until the desired block is transmitted on the carousel, so if the guide is accessed for future programming there could be a delay.

For cable the database is built at the SST head end and sent over land-lines to the cable head end. The cable company sends data any way it wants, e.g. VBIs, satellite, digital, etc.

User Interface

The user interface takes remote control commands from an input device, preferably a remote controller, as its primary input. In one embodiment a user requests various functions by pressing function keys on a remote controller. In another embodiment, the GUI is utilized with different interactive regions on a displayed screen corresponding to different functions. The user moves the cursor over the interactive region corresponding to a desired function and selects the function to generate a command. The particular form of entering a command is not critical and technology for utilizing voice commands may soon be available.

The user interface receives commands and responds with a requested display screen and by performing the function requested by the command. The function performed may be to perform an action such as recording a program, tuning to a channel, accessing a related internet site, purchasing a pay-per-view program, or purchasing merchandise. The data and format of each screen is dependent on the previous screen, time of day, the contents of the data base, the command received, and other parameters. A state table is used to define the screen flow.

For every defined screen, there is an entrance function, an exit function, an update function, and an array of request-handling functions. The entrance function is called when a state is first entered to collect all necessary data and format the screen. The exit function is called to release memory and data for the screen. The update function is called once per minute to update the screen time and to re-draw the screen if any information displayed on the screen needs to be updated.

Once in a particular state, the table contains a reference to another software function corresponding to each key on the remote control or to each interactive region on the screen. These referenced functions will be executed whenever an associated remote control button is pressed or interactive region is selected.

For example, if the user wishes to record a program, in the GUI embodiment, the viewer moves the cursor over the record interactive region which is then selected to request that the recording function be performed. A confirmation screen will then be generated. Once the user confirms the recording request, an entry is made in a recording queue. A record daemon is then called from the real-time executive to examine the queue and manage recording functions.

The screens are displayed by the on-screen display (OSD) controller based on graphic display commands issued by the database engine. Among the primitive commands needed to draw system display screens are the Erase Screen Command; Draw Rectangle Command; Save Rectangle Command; Restore Rectangle Command; Move Rectangle Commands; Write ASCII String Command; and Draw Channel Icon Command.

Each screen includes areas that are constant and based on code and data stored in non-volatile memory and variable areas such as show titles and descriptions which utilize data stored in the database. As described-above in the description of the database engine, the database is structured to facilitate efficient searching for information, generally in the form of ASCII text strings, stored in the database. Additionally, graphics files are also being stored in the database to be displayed in windows of the display screen.

Detailed Description of Pop-Up Messaging System

In the channel space browse mode, as a viewer uses the remote controller to surf through channels the current television program and a rectangular pop-up are simultaneously displayed on the screen. The pop-up includes informational messages about the program or channel currently selected by the remote controller. In the time space browse mode, the pop-up includes informational messages about later programming for the currently viewed channel instead. In the graze mode, the pop-up includes informational messages about the program or channel currently selected. For example, grazing overlays are described in U.S. Pat. No. 5,353,121 at col. 10, line 66. The pop-up is preferably invoked by a channel change command; when the television viewer keys in a new channel to the remote controller, the pop-up appears without more and remains on the screen for a predetermined fixed period of time, e.g., 10 seconds. Alternatively, the pop-up could be invoked by a dedicated key on the remote controller—when the key is pressed, the pop-up appears, and when the key is pressed again, the pop-up disappears. In addition to information about the program or channel, advertising messages are also displayed simultaneously with the current television program. The advertising messages could promote the products or services of the television program sponsor and thus reinforce the advertising message displayed during commercial breaks. Alternatively, the advertising messages could promote the products or services of other sponsors. As another alternative, the advertising messages could promote an upcoming television program or event. As yet another alternative, the advertising messages could be contextually sensitive in that they depend upon the subject of the current television program being displayed; e.g., the advertising messages are selected to appeal to the interests of someone who normally watches that type of television program, such as an advertising message about golf resorts displayed with a television program of a golf match or an advertising message about an airline displayed with a television travelogue. In short, advertising messages are delivered in a pop-up together with informational messages about television programming.

In another embodiment, the pop-up could be an advertising message contextually related to the television program being displayed without any informational message.

Figure 1:
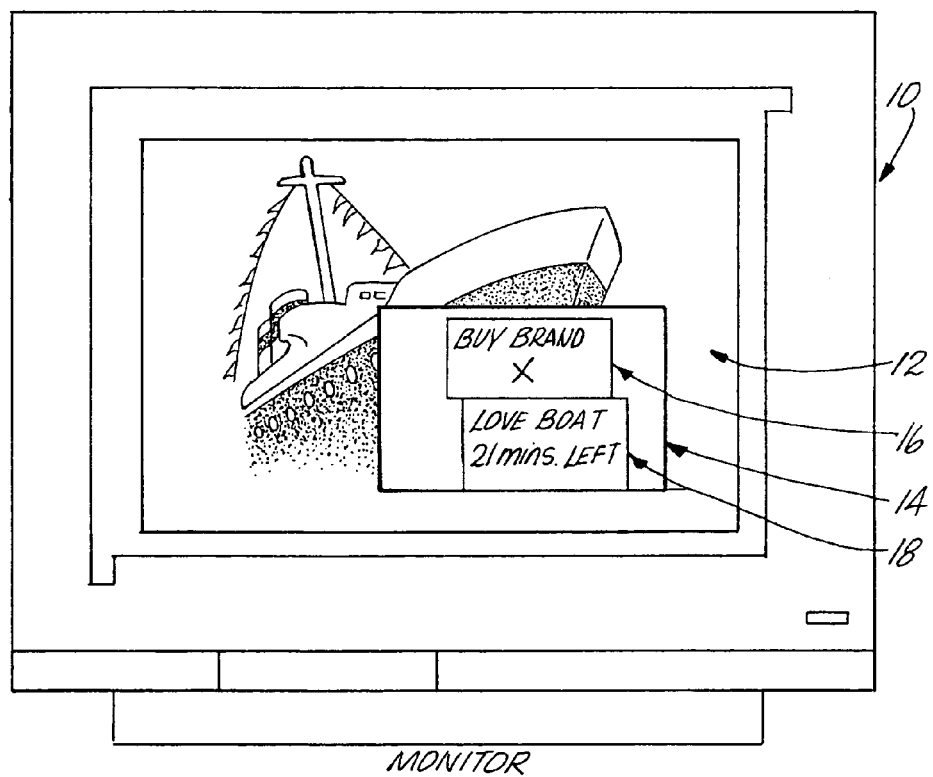
FIG. 1 is a schematic diagram of a display monitor having pop-ups in accordance with the invention.

FIG. 1 illustrates the foregoing. A television 10 displays a telecast television program on a screen 12. In the preferred embodiment, a rectangular pop-up area 14 includes a first variable area 16 that simultaneously displays an advertising message based on data stored in an ad list data structure. Area 16 is variable in the sense that different advertisements are displayed therein, depending on the plan selected by the data provider. For example, a different advertisement could be displayed for each channel to which the television is tuned. Or a different advertisement could be provided on a rotational basis each time the browse or grazing mode is initiated. Or a different advertisement could be displayed after a predetermined time according to a prescribed cycle of advertisements. Or different advertisements could be displayed depending on the context of the television program being displayed. The pop-up area 14 also includes a second variable area 18 that displays information relating to the content of the show being displayed such as title, time left, channel, etc. Area 18 is variable in the sense that as the show changes, the information changes. If desired, pop-up area 14 could include other fixed or variable areas that display information related to the television programming being viewed or of interest to the viewer. Alternatively, areas 16 and 18 could be displayed without area 12 or area 18 could be eliminated. Although it would generally be preferable to display the pop-up prominently near the middle of the screen as shown in FIG. 1, the pop-up could be displayed in an out of the location such as along the bottom margin. The shape of the pop-up could also be different, e.g., as a balloon, or oblong, or circular. Further the size of the pop-up, i.e. the space occupied by the background of the pop-up could vary, depending upon the size of the messages to be displayed.

Different advertisements can be assigned to different channels by including handles to the ad list data structure in the channel table or according to particular shows by including handles in show table entries.

The content of the advertisements is changed by sending commands to update the text or graphic entries in the list data structure.

Detailed Description of Composite EPG and Advertising System

It is well known to display alternatively in different modes, images, such as a received television program or video clips, and an EPG. In such case, the EPG is displayed on a background of one or more solid colors. This aspect of the invention involves another way to display the EPG in a composite with an advertising message contained in such an image.

As is known in the art, portions of an overlying foreground graphic image can be made transparent so that an underlying background image shows through. For example, for an image in the GIF format, the transparency value can be set to the background color so that pixels in the foreground image having a selected palette number will be replaced by pixels in the background image.

Figures 11A, 11B:
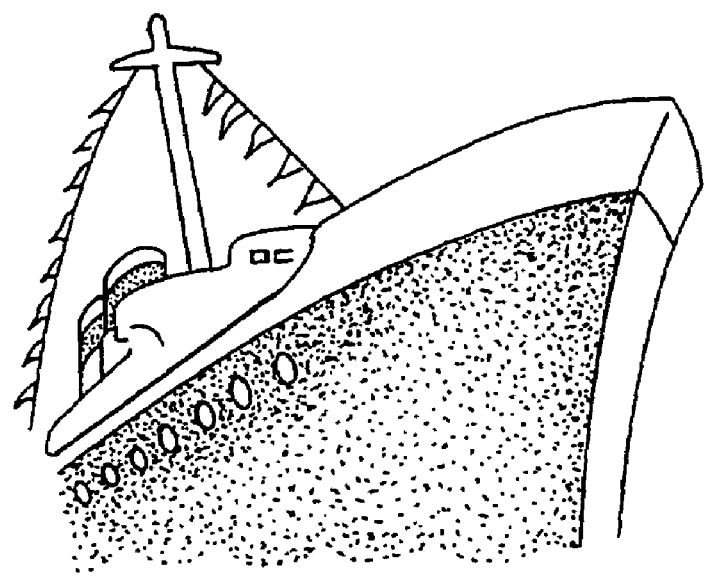
FIGS. 11A to 11C are diagrams of a display monitor having a composite with an advertising message.

The format of an EPG is depicted in FIG. 11A and the format of an advertising message is depicted in FIG. 11B. The EPG format includes outlines of rectangles and characters displayed in rectangles. The rectangles are generally filled by a color corresponding to a palette number for the palette utilized by the graphics system. The palette numbers are stored in RAM or ROM with the EPG data and firmware.

Figure 11C:
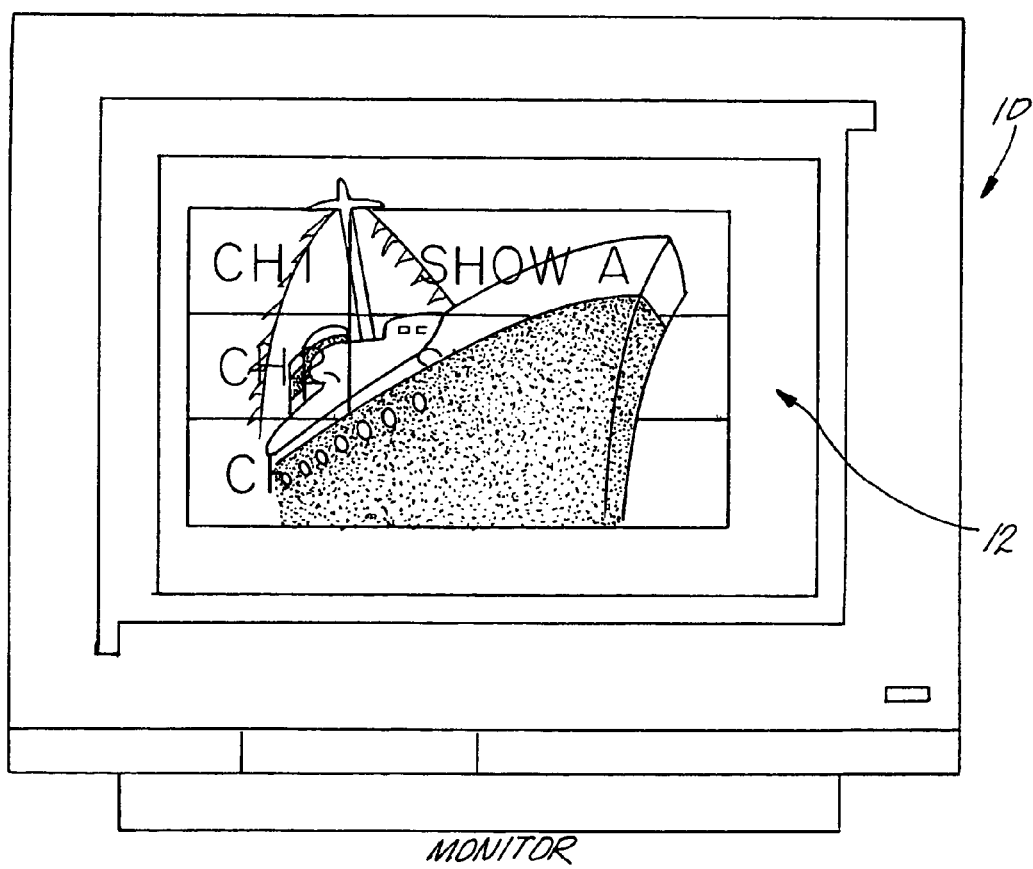

Thus, to display an EPG as depicted in FIG. 11A in a composite with an advertising message, the palette number for the color used to fill the various rectangles will be selected for transparency. Thus, if the background image is the advertising message depicted in FIG. 11B and foreground image is the EPG of FIG. 11A, then the resulting composite image for a transparent EPG is depicted in FIG. 11C. The user has the option by means of the commands issued by the remote controller to display the EPG alone in the conventional fashion on a background of a solid color or colors or in a composite with an advertising message as depicted in FIG. 11C. When the composite is chosen by the user, the microprocessor substitutes the transparency value for the stored background color value before the EPG data is fed to the video processor. The output of the video processor and the advertising message are mixed before the combined signal is fed to the drive circuitry of the display.

As exemplified in FIG. 11C, the layout of the background image should take into consideration the layout of the EPG image. The lettering overlying the dark hull of the ship is not visible in monochrome. Either the ship must be redrawn or text of a different color could be used to enhance visibility.

Alternatively, the foreground image could be a second transparent advertisement. If the background portion of the foreground is made transparent and the background image is laid out so that the advertising message is located within the background of the foreground image then two advertisements can be simultaneously displayed.

What is claimed is:

1. A television system comprising:
   a television program schedule database comprising television program schedule information, informational messages, and information links that link the informational messages to the television program schedule information;
   an advertising database comprising advertising messages and advertisement links that link the advertising messages to the television program schedule information; and
   television equipment configured to:
      display a television program on a substantially full portion of a display monitor;
      select a first informational message for a first program from the television program schedule database that is linked to the television program schedule information by a first information link;
      select a first advertising message from the advertising database that is linked to the displayed television program by a first advertisement link;
      display a pop up window overlaid on the displayed television program, the pop up window including the selected first advertising message and the selected first informational message, wherein the television program is simultaneously displayed with both the first informational message and the first advertising message;
      receive a user indication to display an informational message for a second program;
      in response to receiving the user indication, select a second informational message for the second program from the television program schedule database that is linked to the television program schedule information by a second information link;
      independent of the user indication, select a second advertising message from the advertising database that is linked to the displayed television program by a second advertisement link; and
      update the pop up window, the updated pop up window including the selected second informational message and the selected second advertising message, wherein the television program is simultaneously displayed with both the second informational message and the second advertising message.

2. The television system of claim 1, wherein the selected first informational message or the selected second informational message relates to the displayed television program.

3. The television system of claim 1, wherein the selected first informational message or the selected second informational message relates to later programming on a channel of the displayed television program.

4. The television system of claim 1, wherein the selected first informational message or the selected second informational message relates to current programming on a channel of the displayed television program.

5. The television system of claim 1, wherein the television equipment is further configured to display a composite of an EPG and an advertising message overlaid on the displayed television program.

6. The television system of claim 5, wherein the television equipment is further configured to display an EPG overlaid on the displayed television program.

7. The television system of claim 5, wherein the television equipment is further configured to store EPG data including at least one stored background color value.

8. The television system of claim 7, wherein the television equipment is further configured to use the stored background color value to display the EPG alone.

9. The television system of claim 7, wherein the television equipment is further configured to substitute a transparent value for the stored background color value to display the composite.

10. The television system of claim 1, in which the selected first advertising message or the selected second advertising message is about a product or service.

11. A method for displaying an advertisement over a television program, the method comprising:
displaying a television program on a substantially full portion of a display monitor;
storing television program schedule information, informational messages, and information links that link the informational messages to the television program schedule information in a television program schedule database;
storing advertising messages and advertisement links that link the advertising messages to the television program schedule information in a advertising database;
selecting a first informational message for a first program from the television program schedule database that is linked to the television program schedule information by a first information link;
selecting a second advertising message from the advertising database that is linked to the displayed television program by a second advertisement link;
displaying a pop up window overlaid on the displayed television program, the pop up window including the selected first advertising message and the selected first informational message, wherein the television program is simultaneously displayed with both the first informational message and the first advertising message;
receiving a user indication to display an informational message for a second program;
in response to receiving the user indication, selecting a second informational message for the second program from the television program schedule database that is linked to the television program schedule information by a second information link;
independent of the user indication, selecting a second advertising message from the advertising database that is linked to the displayed television program by a second advertisement link; and
updating the pop up window, the updated pop up window including the selected second informational message and the selected second advertising message, wherein the television program is simultaneously displayed with both the second informational message and the second advertising message.

12. The method of claim 11, wherein the selected first informational message or the selected second informational message relates to the displayed television program.

13. The method of claim 11, wherein the selected first informational message or the selected second informational message relates to later programming on a channel of the displayed television program.

14. The method of claim 11, wherein the selected first informational message or the selected second informational message relates to current programming on a channel of the displayed television program.

15. The method of claim 11, further comprising displaying a composite of an EPG and an advertising message overlaid on the displayed television program.

16. The method of claim 15, further comprising displaying an EPG overlaid on the displayed television program.

17. The method of claim 11, in which the selected first advertising message or the selected second advertising message is about a product or service.

18. The television system of claim 1, wherein the pop up window further includes a television program title simultaneously displayed with both the first informational message and the first advertising message or both the second informational message and the second advertising message.

19. The television system of claim 1, wherein the selected first advertising message or the selected second advertising message is about an upcoming television program or event.

20. The television system of claim 1, wherein the selected first advertising message or the selected second advertising message is related to a sponsor of the displayed television program.

21. The television system of claim 20, wherein the selected first advertising message or the selected second advertising message promotes products and services of the sponsor.

22. The television system of claim 1, wherein the selected first advertising message or the selected second advertising message is related to a subject of the displayed television program.

23. The television system of claim 1, wherein a different advertising message is selected each time the pop up window is displayed.

24. The television system of claim 1, wherein the second advertising message is selected and displayed a predetermined time after the first advertising message is selected and displayed.

25. The method of claim 11, wherein the pop up window further includes a television program title simultaneously displayed with both the first informational message and the first advertising message or both the second informational message and the second advertising message.

26. The method of claim 11, wherein the selected first advertising message or the selected second advertising message is about an upcoming television program or event.

27. The method of claim 11, wherein the selected first advertising message or the selected second advertising message is related to a sponsor of the displayed television program.

28. The method of claim 27, wherein the selected first advertising message or the selected second advertising message promotes products and services of the sponsor.

29. The method of claim 11, wherein the selected first advertising message or the selected second advertising message is related to a subject of the displayed television program.

30. The method of claim 11, wherein a different advertising message is selected each time the pop up window is displayed.

31. The method of claim 11, wherein the second advertising message is selected and displayed a predetermined time after the first advertising message is selected and displayed.

* * * * *